(12) United States Patent
Lizotte et al.

(10) Patent No.: US 12,240,130 B2
(45) Date of Patent: Mar. 4, 2025

(54) SYSTEM AND METHOD FOR AUTOMATED MOVEMENT OF A ROBOTIC ARM

(71) Applicant: General Electric Company, Schenectady, NY (US)

(72) Inventors: Antoine Lizotte, Bromont (CA); Felix Beaudry, Bromont (CA); Alain Warren, Granby (CA); John Karigiannis, Laval (CA); Philippe Laurin, Bromont (CA)

(73) Assignee: General Electric Company, Schenectady, NY (US)

( * ) Notice: Subject to any disclaimer, the term of this patent is extended or adjusted under 35 U.S.C. 154(b) by 149 days.

(21) Appl. No.: 17/857,511

(22) Filed: Jul. 5, 2022

(65) Prior Publication Data

US 2023/0009468 A1    Jan. 12, 2023

Related U.S. Application Data

(60) Provisional application No. 63/219,195, filed on Jul. 7, 2021.

(51) Int. Cl.
| | |
|---|---|
| *B25J 9/16* | (2006.01) |
| *B25J 19/02* | (2006.01) |
| *G06T 7/70* | (2017.01) |

(52) U.S. Cl.
CPC ........... *B25J 9/1697* (2013.01); *B25J 9/1612* (2013.01); *B25J 9/1664* (2013.01); *B25J 19/022* (2013.01); *B25J 19/023* (2013.01); *G06T 7/70* (2017.01)

(58) Field of Classification Search
CPC ...... B25J 9/1697; B25J 9/1612; B25J 9/1664; B25J 19/022; B25J 19/023; G06T 7/70; G05B 2219/40032; G05B 2219/40607; G05B 2219/40613
See application file for complete search history.

(56) References Cited

U.S. PATENT DOCUMENTS

| | | | |
|---|---|---|---|
| 4,843,708 A | * | 7/1989 | Yokoi ................... B23Q 17/24 29/469 |
| 5,159,745 A | | 11/1992 | Kato |
| 5,586,387 A | | 12/1996 | Nakatani et al. |
| 7,155,800 B2 | | 1/2007 | Adis et al. |
| 7,987,600 B2 | | 8/2011 | Erill et al. |
| 9,597,803 B2 | | 3/2017 | Mimura et al. |
| 10,399,193 B2 | | 9/2019 | Gray |

(Continued)

FOREIGN PATENT DOCUMENTS

| | | |
|---|---|---|
| CN | 108953395 A | 12/2018 |
| EP | 0433522 A1 | 6/1991 |

(Continued)

*Primary Examiner* — Abby Y Lin
*Assistant Examiner* — Dylan M Katz
(74) *Attorney, Agent, or Firm* — Fitch, Even, Tabin & Flannery LLP

(57) ABSTRACT

A positioning system is provided for insertions and placements with increased accuracy and precision for the placement and insertion of components into elements. The system may utilize one or more sensors to provide individual images or data for each individual insertion of components into elements. The system may use known information to compare the individual images or data to provide increased accuracy and precision for insertion of components into elements.

16 Claims, 15 Drawing Sheets

(56) References Cited

U.S. PATENT DOCUMENTS

| | | | |
|---|---|---|---|
| 10,792,816 B2 | 10/2020 | Goto et al. | |
| 2019/0118383 A1* | 4/2019 | Yoshiura | G06T 7/73 |
| 2021/0001486 A1* | 1/2021 | Salem | B25J 9/1664 |
| 2021/0039264 A1 | 2/2021 | Ishizuka et al. | |
| 2021/0245362 A1* | 8/2021 | Lepage | B25J 9/065 |
| 2023/0339111 A1* | 10/2023 | Hamaya | B25J 9/1664 |

FOREIGN PATENT DOCUMENTS

| | | |
|---|---|---|
| FR | 3127024 | 3/2023 |
| FR | 3127025 | 3/2023 |
| FR | 3127269 | 3/2023 |
| FR | 3129375 | 5/2023 |
| FR | 3129428 | 5/2023 |
| FR | 3129432 | 5/2023 |
| FR | 3129436 | 5/2023 |
| FR | 3129690 | 6/2023 |
| FR | 3129970 | 6/2023 |
| FR | 3129972 | 6/2023 |
| FR | 3130313 | 6/2023 |
| FR | 3130323 | 6/2023 |
| FR | 3130747 | 6/2023 |
| FR | 3130874 | 6/2023 |
| FR | 3130875 | 6/2023 |
| FR | 3130877 | 6/2023 |
| FR | 3130879 | 6/2023 |
| FR | 3130894 | 6/2023 |
| FR | 3130895 | 6/2023 |
| FR | 3130896 | 6/2023 |
| FR | 3130897 | 6/2023 |
| FR | 3132279 | 8/2023 |
| FR | 3132729 | 8/2023 |
| FR | 3132743 | 8/2023 |
| FR | 3133367 | 9/2023 |
| FR | 3133368 | 9/2023 |

* cited by examiner

FIG. 1
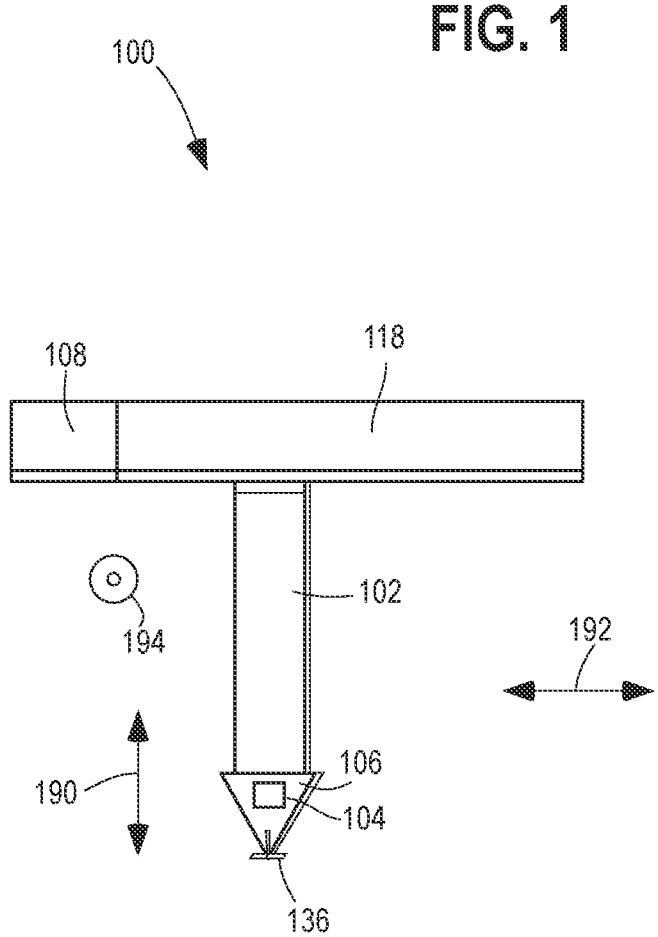
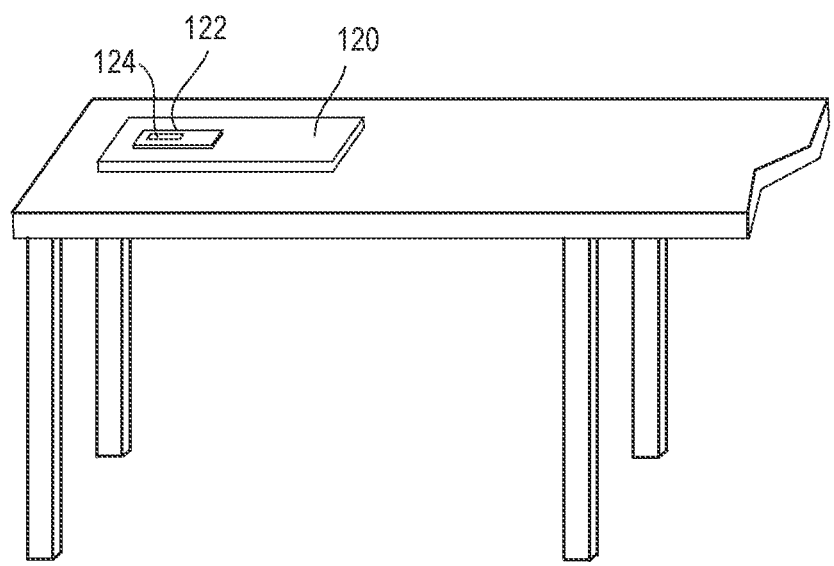

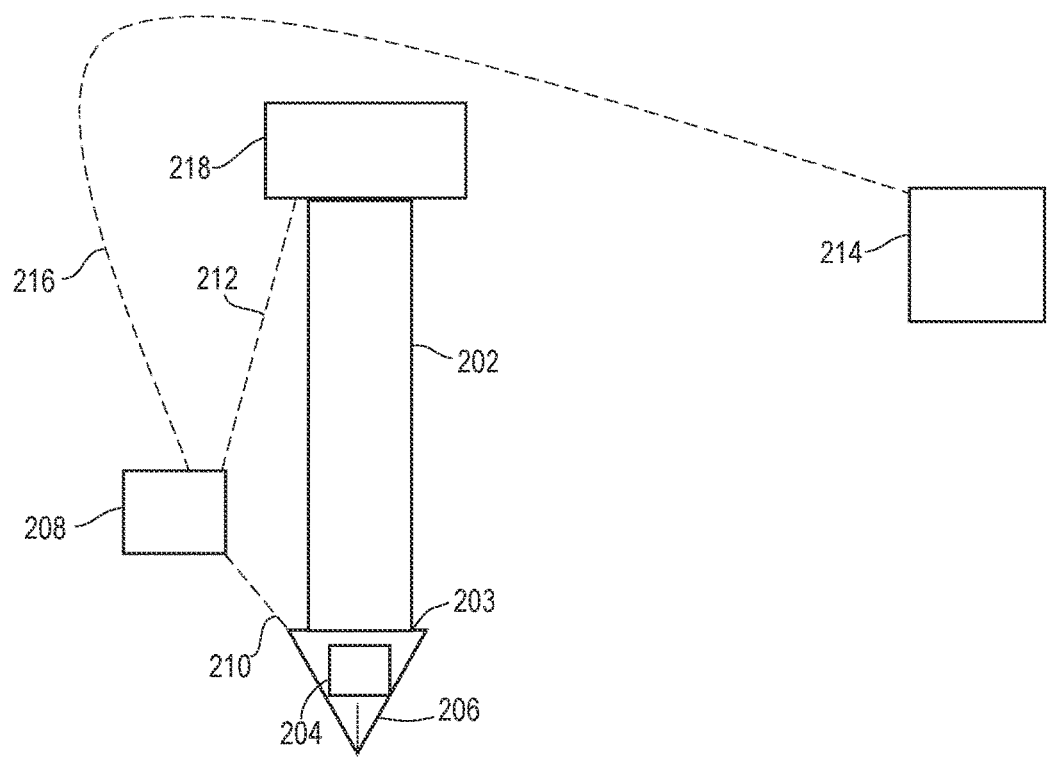
FIG. 2B
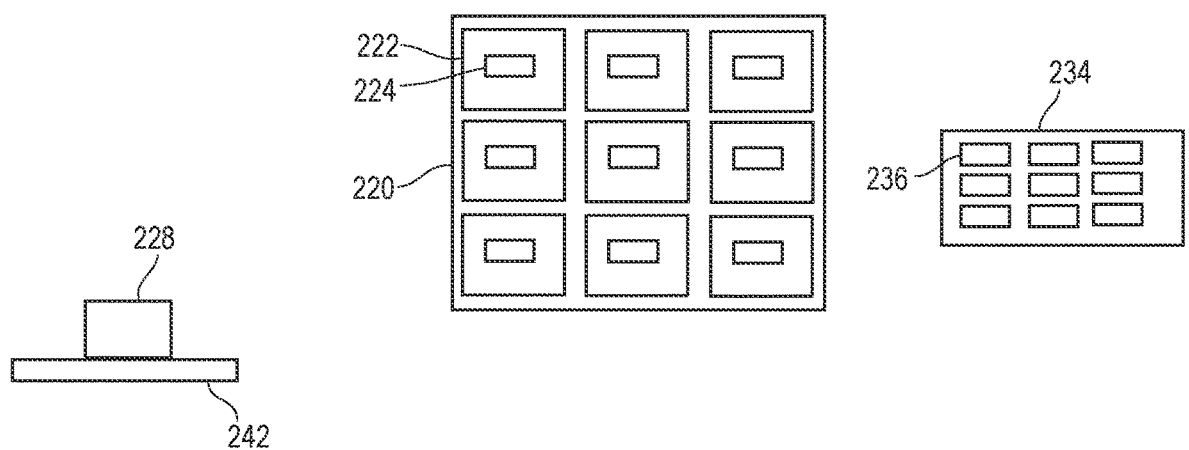

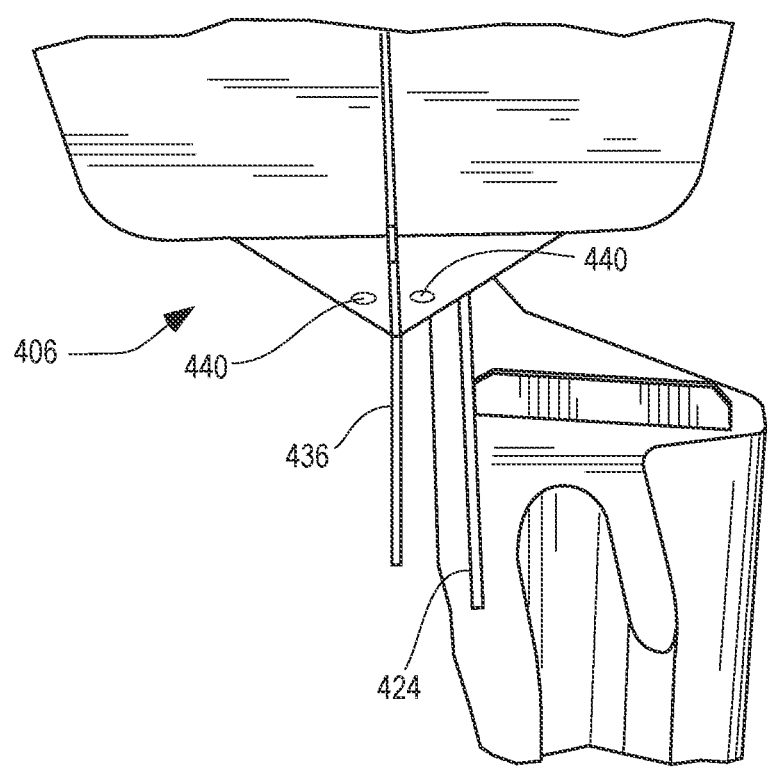

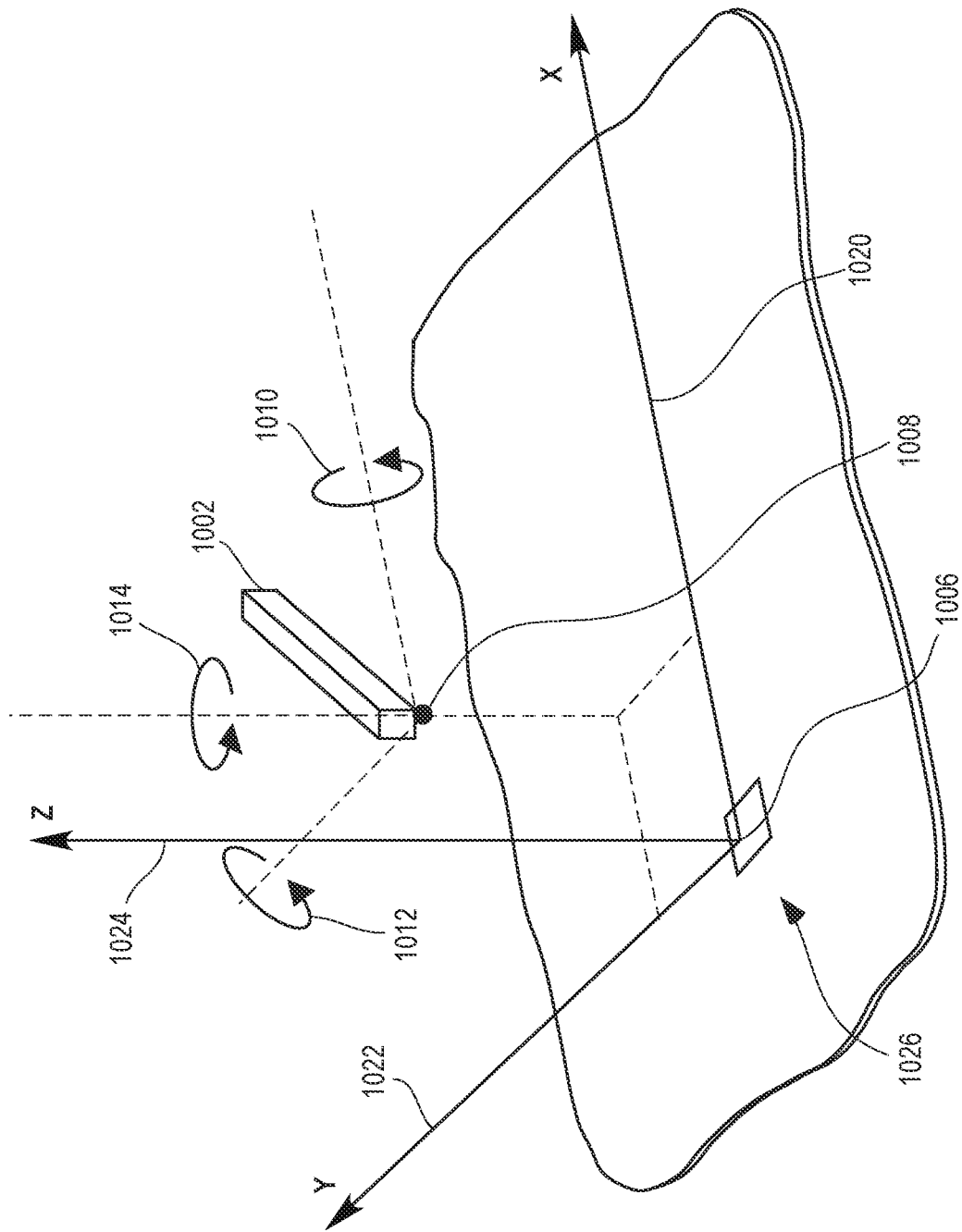

SYSTEM AND METHOD FOR AUTOMATED MOVEMENT OF A ROBOTIC ARM

CROSS-REFERENCE TO RELATED APPLICATION

This application claims the benefit of U.S. Provisional Patent Application No. 63/219,195, filed Jul. 7, 2021, which is incorporated by reference herein in its entirety.

TECHNICAL FIELD

These teachings relate generally to movement systems and more particularly to placements and insertions of components into elements using sensors.

BACKGROUND

Manufacturing methods that require high accuracy and precision for placing and inserting components into other parts or elements are typically performed manually by human operators. These manual approaches require fine manipulation, dexterity, and prolonged concentration. Reliance on human operators for performing repetitive motion tasks creates a potential risk of misaligned components or placement of nonconforming parts due to human error.

Previous robotic systems that insert components into other parts or elements may utilize long chains of spatial calculations for calculating positions. The long chains of calculations are susceptible to inaccuracies due to the number of relations in the chain, for example, a single inaccuracy may cause the resulting final position to be inaccurate compared to the desired final position.

BRIEF DESCRIPTION OF THE DRAWINGS

Various needs are at least partially met through provision of the method and systems for automated part insertion of components described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which:

FIG. 1 comprises a diagram as configured in accordance with various embodiments of these teachings;

FIG. 2B comprises a diagram as configured in accordance with various embodiments of these teachings;

FIG. 4C comprises an illustration as configured in accordance with various embodiments of these teachings;

FIG. 10 comprises a diagram as configured in accordance with various embodiments of these teachings.

Figure 2A:
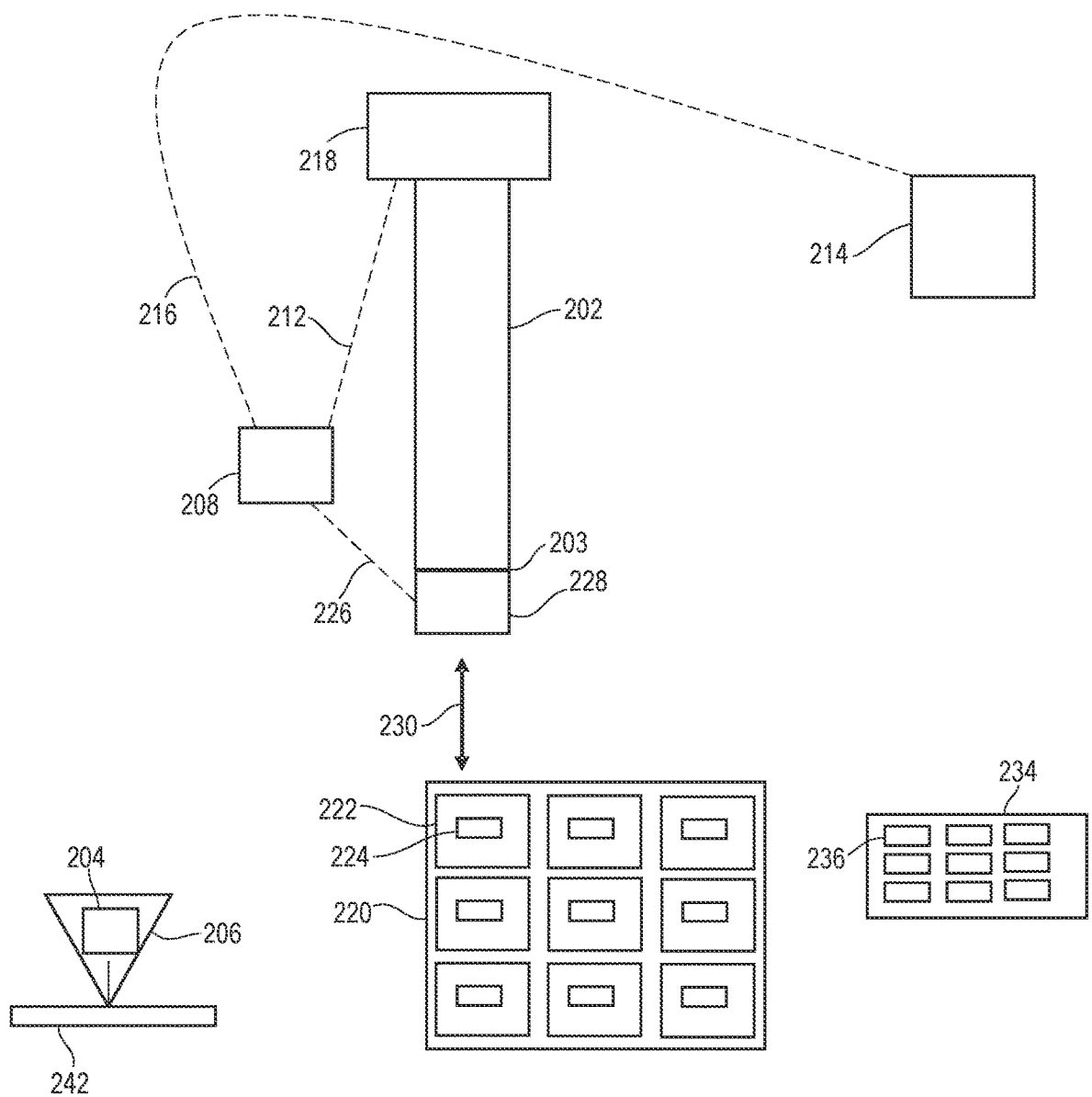
FIG. 2A comprises a diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

The approaches presented herein provide for the automated movements, insertions, or placements of a component into or at a target location and/or another element or part (e.g., the insertion of a seal into a slot within an aircraft engine part or element) with increased accuracy and precision as compared to previous approaches. Images of the component, the element to be inserted, and/or the device performing the insertion are obtained (e.g., images of the seal, the aircraft engine element including a target location, and a manipulator device coupled to a robotic arm that inserts the seal into the slot). Various image analysis approaches are applied to the images to determine the correct coordinates of the various elements, e.g., coordinates of the seal, a manipulator device holding the seal, and the target location into which the seal is to be inserted by the manipulator device. The results of the analysis are used to direct or control movement (or correct movement) of a robotic arm to accurately place the component into the part (e.g., the seal into the slot).

Advantageously, the present approaches provide increased accuracy and precision of insertion of components into elements without the need for human operators to manually insert the components, or the potential for less than desired accuracy and/or precision of conventional robotic systems. Further, the present approaches provide six degrees of freedom around a robot origin or robot base to provide a fuller range of motion in three-dimensional space by the robotic arm.

In some examples, these approaches analyze an image taken close to the point of insertion, e.g., about 10 mm or less, to determine additional information regarding the location, position, coordinates, and/or orientation information of one or more of, a slot, a seal, or a manipulator or gripper holding the seal. As mentioned, the present approaches may improve the accuracy and precision of these placements or insertions, as well as potentially reducing human-power for consistent and proper insertions. The present approaches may also decrease the time required for the increased accuracy and precision insertions of the seals into the slots.

In the examples described herein, various coordinates are used to describe the location of objects. More specifically and referring now to FIG. 10, two types of coordinates are used to describe the location and position of an object 1002 within a workspace. As shown in FIG. 10, an object 1002 is shown in three-dimensional space and is spaced and positioned relative to an x-axis 1020, a y-axis 1022, and z-axis 1024 (collectively called XYZ axis 1026) having an origin 1006.

A point 1008 on the object can be described with a positional coordinate X, Y, Z, and these points are with respect to the origin 1006 of the X, Y, Z axis 1026. In addition, rotations relative to the axis 1004 are described. A first rotation 1010 (also called and referred to as Rx herein) describes the rotation of the object about and/or with respect to the x-axis 1020. A second rotation 1012 (also called and referred to as Ry herein) describes the rotation of the object about and/or with respect to the y-axis 1022. A third rotation 1014 (also called and referred to as Rz herein) describes the rotation of the object about and/or with respect to the z-axis 1024. The rotations are collectively referred to as rotational coordinates.

As will be described elsewhere herein, the positional coordinates correspond to locations (e.g., on structures, between structure, of seals and/or of the gripper). In other words, these positional coordinates describe where the structures are located within the workspace. The rotational coordinates provide additional detail regarding how the structures are oriented and/or tilted within the workspace. Utilizing both the positional and rotational coordinates allows the system to determine a location and an orientation of the structures relative to the robot origin (i.e., a base of the robot) for increased accuracy in inserting components.

FIG. 10 shows coordinates in any coordinate system. However, the approaches herein rely on the use of multiple coordinate systems. For example, one coordinate system relates to a manipulator or gripper device coupled to an end of on the robotic arm, and a global coordinate system describes all elements in a workspace (e.g., part, slot, gripper, robot arm, robot) in a single, unified system where every position is relative to the robot origin of the robot.

In order to effectively control movement of the robotic arm, an insertion path is determined. The insertion path defines a series of movements based upon coordinates. These coordinates must be from a single coordinate system, preferably a global coordinate system. In some of the approaches described herein, some coordinate information needed to form the insertion path is determined in terms of the gripper-based coordinate system. In this case, the coordinates from the gripper-based coordinate system are translated to conform to coordinates in the global coordinate system. Translation may be made according to rules or other translation relationships and performed automatically as various types of information are correlated to form the insertion path.

In many of these embodiments, an approach of automated insertion of seals into slots includes determining a location, position, coordinates, and/or orientation of an individual slot within an engine element. The approach further includes determining a position, location, coordinates, and/or orientation of a seal within a manipulator or gripper. The approach further includes providing additional and/or an updated position, location, coordinates, and/or orientation of one or more of the slot, the seal, and the manipulator or gripper.

The position, location, coordinates, and/or orientation of the slot may be determined by utilizing one or more sensors, such as a camera and/or application of a laser beam from a laser device to take an image of the slot and provide measurement information of the element and corresponding slot. The position, location, coordinates, and/or orientation of the seal within the gripper may be determined by utilizing a sensor, such as a camera, to take an image of the seal within the gripper. The additional and/or updated position, location, coordinates, and/or orientation of one or more of the slot, the seal, and the gripper may be determined by utilizing a sensor, such as a camera, to take an image of the seal within the gripper near the point of insertion, about 10 mm away from the element or the slot in this example. While a single sensor is discussed throughout the disclosure for each step and/or associated image, it is contemplated herein that one or more sensors may be utilized along each step of the process.

Increased accuracy and precision of the insertion of components by robots is accomplished by analyzing images of the components to be placed or inserted, the areas or parts where the component is to be inserted or placed, and/or the relative position of the component to be inserted and the part where the component is to be inserted. Known coordinates of the robot (or parts of the robot, such as a manipulator or gripper) are utilized in the analysis process to determine the positions, lengths, relative displacement, and other descriptors of features in the images. Once the accurate position information is determined, operation of the robot can be adjusted to accurately insert or place components in the element or part.

In one specific example, an image of an engine element including a slot (a "captured image") may be analyzed to determine position information using computer vision, machine vision techniques, and/or distance measurement techniques. In aspects, a laser device associated with a robotic arm of a robot that will insert a seal into the slot of the aircraft engine part is caused to project a laser beam onto a surface of the aircraft engine part into which the seal is to be inserted. This analysis determines a distance between the aircraft engine part and the laser device.

Once the distance information between the aircraft engine part and the laser device is determined, the captured image is further analyzed such that other information about the element or insertion location (e.g., the edges of the slot and/or the seal) are determined. In aspects, this process may analyze different pixel darkness values to determine the edges of the slot. Another captured image of a seal may be obtained and analyzed in a similar way.

A CAD file may include images, representations, dimensions, and other information concerning the aircraft engine part, e.g., shapes, outlines, dimensions, of the aircraft engine part including a slot in the aircraft engine part. Another CAD file may include similar information about a seal. The element represented in the CAD files also includes or is associated with an origin position such that other features of the element can be described by coordinates relative to the origin. Further, in one illustrative embodiment, the images are point cloud data.

Once the edges, or shape, of the slot and/or the seal from the captured image are detected and/or determined, the image of the element in the CAD file is compared to the element as presented in the captured image. More specifically, the image of the element in the CAD file is size and/or shaped matched to the image of the element in the captured image to align the image of the element in the CAD file with the image of the element in the captured image, as known by one skilled in the art, such as computer vision, machine vision techniques, and/or distance measurement techniques. Aligning the image of the element in the CAD file with the image of the element in the captured image may include aligning an origin of the CAD file with the captured image to give a reference to the sizing that occurs during the size matching. Using known parameters of the camera, i.e., the lens size, and using a known pixel size for the captured image, the sizing of element in the CAD file relative to the image of the element in the captured image provides position information, e.g., coordinates, relating to the slot and its placement in the actual part.

Utilizing the laser device, or other suitable distance measuring sensors, the orientation, i.e., the tilt of the element relative to the global coordinate system may be known. The orientation may first be known to the gripper in terms of the gripper coordinate system and translated into the global coordinate system. In doing so, a laser beam from the laser device is projected onto and returned from the surface of the element. This operation provides information regarding the orientation of the slot, such as rotational coordinates, such as the tilt, of the slot, or the corresponding corners thereof.

Information concerning the position/orientation of the slot is in the gripper-based coordinate system. In aspect, this gripper-based coordinate information is automatically translated into coordinates conforming to the global coordinate system.

In another example of the application of the approaches provided herein, a gripper device, or manipulator device (disposed at the end of an arm of a robotic device) is configured to secure or hold a seal to be inserted into a slot of an aircraft engine element. An image of the seal and gripper device is obtained. The image of the seal within the gripper may include reference marks and/or openings to provide known locations for the system to reference. Positions or coordinates of the gripper device and corresponding reference marks and/or reference openings on the gripper are known relative to a coordinate system of the gripper, the face plate, and/or the global coordinate system. As such, the analysis can provide the position, e.g., the coordinates, position, or location of the seal with respect to the gripper. Further, this analysis also provides the orientation of the seal within the gripper, e.g., the angle or rotation of the seal with respect to the gripper.

In a further example, an image is obtained of one or more of the slot, the seal, and the gripper device. This image is analyzed to provide additional and/or updated positions, e.g., update the coordinates, position, or location of the slot and/or the gripper device with the seal. In so doing, image processing and analysis techniques the same or similar to that described above are utilized, including, for example, detecting edges within the image, size matching a corresponding CAD file, and using known information, e.g., known reference marks on the gripper, to provide the additional and/or updated information. Further, the results of this analysis may provide additional information relating to the orientation of the slot and the gripper to be updated, e.g., the rotation of the gripper relative to the slot.

The approaches provided herein obtain absolute and accurate coordinates of items in images, e.g., seals, slots, and aircraft engine parts, relative to each other. Since these coordinates are now available, the operation of a robotic arm, e.g., moving the robotic arm through the use of actuators and joints while carrying a seal in a gripper device, can be controlled, and adjusted to precisely place the seal in the slot on the aircraft engine part. This operation can be accomplished on the first try, without other placement attempts that may miss inserting the seal into the slot. In aspects, precise adjustments are obtained at least in part since an image of the gripper with seal in close proximity to the slot in the aircraft engine part are obtained and analyzed. Control paths and insertion paths are discussed herein. In one illustrative embodiment, the system may obtain information from images taken at different steps in the process to provide information to generate an insertion path to insert the seal into the slot. In some embodiments, the control path and insertion path may be the same path. In some embodiments, the first two images described below may allow the system to generate a preliminary control path for insertion which may then be updated, adjusted, and/or corrected when generating or finalizing the insertion path. The system may utilize the preliminary control path for insertion to move the robotic arm close to the point of insertion. In some embodiments, an operator may move the robotic arm close to the point of insertion, thus avoiding the step of generating the preliminary control path for insertion.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The foregoing and other benefits may become clearer upon making a thorough review and study of the following detailed description. It will be appreciated that the approaches provided herein are described in examples relating to inserting seals into an engine element. Although described as inserting seals into slots of engine elements, and in some examples, aviation engines, these approaches are not limited to this use and can be applied to inserting any component into any element in any application.

References relating to position and orientation coordinates have and will be discussed herein. These location, coordinates, positions, and orientations may relate to the coordinates of the slot, the element, the gripper device, and/or the seal. In some embodiments, the controller may interpret and translate these locations, coordinates, positions, and orientations into a global coordinate system relative to the robot, or a robot origin, a known point to the system. In particular, the gripper may utilize a gripper-based coordinate system that is known relative to a global coordinate system. As the gripper, and in turn the gripper coordinate system is moved, a translation between the gripper coordinate system and the global coordinate system may be used to track the gripper coordinate system in terms of the global coordinate system. The coordinates of the associated parts and elements, as well as any rotational coordinates may be translated from one coordinate system into a global coordinate system.

In some embodiments, the gripper may be pre-calibrated using camera calibration such that the position of the gripper relative to the robotic arm may be known. The calibration process may occur routinely to reduce potentially inconsistencies that may arise in the gripper's position over time. The pre-calibrated data from the gripper may also provide the grippers position relative to the robot origin. In some embodiments, the cameras may be calibrated (e.g., using a calibration grid) such that distances between points (e.g., gripper reference points) in an image may be determined.

The positional coordinates, x, y, and z, as well as the rotational coordinates, $R_x$, $R_y$, and $R_z$ of the slot and/or the element, and/or the gripper may be determined through the use of image analysis techniques such as computer vision and/or machine vision techniques utilizing images taken throughout the insertion process. The positional coordinates, x and z, as well as the rotational coordinates, $R_y$, of the seal may be determined by analyzing a first image, also referred to as the gripped image. The y positional coordinate and $R_x$ and $R_z$ rotational coordinates may be determined based on the gripper's pre-calibration to the robot, such that the robot knows the location and/or position of the gripper. The x and y positional coordinates of the slot and/or the element, as well as the y positional coordinate of the seal, may be determined and updated utilizing another image, also referred to as the inspection image. Similarly, the $R_z$ rotational coordinate of the slot and/or the element may be determined and updated utilizing a previous or additional image.

The positional coordinates correspond to locations between the structure described herein relative to the robot, for example, relative to the robot origin, the robotic arm, the gripper device. These positional coordinates describe where the structures are located within the workspace. The rotational coordinates correspond to certain tilts and rotations of the structures relative to the robot, for example, relative to the robot origin, the robotic arm, and/or the gripper device. These rotational coordinates provide additional detail regarding how the structures are oriented and/or tilted within the workspace. Utilizing both the positional and rotational coordinates allows the system to determine a location position and/or an orientation of the structures relative to the global coordinate system, and in turn, the robot for increased accuracy in inserting components. A workspace may include the area the robot is placed and/or the area in which the robot can reach using the robotic arm.

Referring now to FIG. 1, a system 100 for automated part insertion of components is described. The system 100 includes a controller (e.g., a processor) 108, a robotic arm 102, a first sensor 104, a gripper 106, a motor 118. The system further includes a second sensor and a third sensor, not illustrated in FIG. 1. The system 100 may further include communication links between the controller 108, the gripper 106, and/or the first sensor 104, a communication link between the controller 108 and the motor 118, and a communication link between the second sensor and/or third sensor and the controller 108. The system 100 may include one or more controllers 108 and/or one or more motors 118.

A carrier 120 containing engine elements 122 having a slot 124 or other openings may be provided. Further, a bin containing seals 136, as shown in FIG. 2A, may be provided within the vicinity of the system 100. The carrier 120 may include trays and other structures capable of holding engine elements 122 within. The seals 136 are elements, structures, or objects that join two other elements together or prevent anything from passing. For example, a seal may prevent a liquid from moving through a slot.

The controller 108 is coupled to the motor 118 and the gripper 106 and/or first sensor 104 via the communication links described above. It will be appreciated that as used herein the term "controller" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The controller 108 may be configured (for example, by using corresponding programming stored in a memory as will be well understood by those skilled in the art) to carry out one or more of the steps, actions, and/or functions described herein. The controller 108 may include a memory that includes computer instructions that implement any of the functions described herein. In some embodiments, the controller 108 may be coupled to the communication links. This may allow for the controller 108 to send control signals across the communication links to control a movement or operation. In some embodiments, the controller 108 may be physically coupled to one or more of the motor 118, the robotic arm 102, and the gripper 106 and/or the first sensor 104.

The gripper 106 is a mechanical element that is configured to grasp, hold, pinch, and/or grip components or parts such as a seal 136. For instance, the gripper 106 may include pinching members, a first member and a second member, between which another component may be gripped, held, or secured. The gripper 106 may also grip in other ways besides pinching elements. For example, the gripper 106 may hook or loop a component around one or both of the pinching members, or in some embodiments, may use suction.

The communication links may be a wired or wireless connection for control signals from the controller 108 to be communicated. Examples of a wireless connection, or communication network, may include LAN, WAN, Internet, Wi-Fi, Bluetooth, or some other wireless connection. In some other embodiments the elements may be configured for wired, wireless, optical, fiber optical cable, satellite, or other such communication configurations or combinations of two or more of such communications.

As described herein, the first sensor 104 may also be referred to as an onboard sensor, or an insertion sensor. Also described herein, the second sensor, as shown in FIG. 2A, may be referred to as an inspection sensor. The third sensor, as shown in FIG. 2A, may be referred to as a global sensor or a fixed sensor. The first sensor 104 may be an optical sensor such as a camera. Further, the first sensor 104 may be a monocular camera. Similarly, the second sensor and the third sensor may be a monocular camera. The first sensor 104 and/or the second sensor and the third sensor may provide 2-dimension images.

The gripper 106 and first sensor 104 may be permanently coupled to one another such that the first sensor 104 is contained, enclosed by, or disposed within the gripper 106. The gripper 106 may be coupled to the robotic arm 102. The gripper 106 may also be detachably coupled to the robotic arm 102, or an end thereof. In some embodiments, the first sensor 104 may be attached to the gripper 106. In some embodiments, the first sensor 104 may be coupled to the robotic arm 102.

The carrier 120 may be moved into the vicinity of the system 100 via a conveyor belt or other movement means. Similarly, the bin may be moved into the vicinity of the system 100 via a conveyor belt, another robotic system, or other movement means. The carrier 120 may include one or more elements 122 placed inside of the carrier 120. Each element 122 may contain one or more slots 124. The bin may include one of more seals 136 placed inside of the bin.

In one example of the operation of FIG. 1, a motion of the robotic arm 102 and an operation of the gripper 106 coupled to an end of the robotic arm 102 may be controlled using the controller 108. The first sensor 104 may be coupled to the robotic arm 102 to obtain a first image, wherein the first image being of the engine element 122 including a slot 124 in which a component is to be inserted. The gripper 106, the engine element 122 including the slot 124 being disposed in the carrier 120 are shown in the first image. The first image is obtained near the point of insertion and in close vicinity of a seal 136 in the slot 124, and in a close vicinity of the slot 124, including the gripper 106, about 10 mm (or less) between the gripper 106 and the slot 124. By "near the point of insertion and in close vicinity," it is meant that there is about a 10 mm distance (or less) between the gripper 106 and the slot 124 and/or the engine element 122.

As described herein, various images of objects are analyzed to determine positions of these components. As described above, the coordinates share a common coordinate system, also referred to as a global coordinate system. The global coordinate system includes coordinates measured and placed with respect to the robot or portions of the robot (e.g., a base of the robotic arm). Since all determined coordinates are determined with respect to the common coordinate system, the robotic arm can be moved accurately to place seals into the component or part. Information obtained and used to determine an insertion path may initially be in terms of a gripper-based coordinate system and may be translated to conform to the global coordinate system before this information can be used in a correlation process to determine the insertion path.

As mentioned, the approaches provided herein include various elements having positions described by a common coordinate framework, coordinate system, or frame of reference. This common coordinate system is described by an x-axis, a y-axis, and a z-axis. In this system, the z-axis is generally perpendicular to the ground. The x-axis is generally into and out of the page. The y-axis is generally parallel to the ground (e.g., side to side). Although system motions and measurements are described in a specific coordinate system, the coordinate system described provides a non-limiting example to provide additional clarity (e.g., z-axis being perpendicular to the ground and defining a vertical distance), the actual reference frame and axis notation will depend on the configuration of the system for a particular application.

The first image is obtained from the first sensor 104 and the first image is processed using the controller 108 to obtain slot position information, the slot position information describes a position of the slot 124 and/or the element 122 with respect to the gripper 106. The slot position information includes, in examples, the position and/or coordinates of the slot with respect to the gripper 106, the robot origin, or another known point within the system 100. The results of this analysis provide absolute coordinates of the slot 124 in the element 122 with respect to the gripper.

A second image and distance information from a second sensor is also obtained and the second image and the distance information are processed by the controller 108 to obtain slot orientation information and z-axis information. The slot orientation information and the z-axis information describe an orientation, or tilt along a plane as compared to the surface of the engine element 122, and a position of the slot 124 in the engine element 122 as disposed in the carrier 120 relative to the robotic arm 102, the gripper 106, or the robot origin.

A third image of the seal 136 from the third sensor is also obtained and processed by the controller 108 to obtain a component orientation information and/or a seal orientation information, the seal orientation information describing an orientation of the seal 136 relative to the gripper 106. By "seal orientation," it is meant the position of the seal 136 within the gripper 106 (e.g., where the gripper 106 is holding the seal 136 along a length, and/or the angle or rotation of the seal 136 within the gripper 106. Image analysis techniques for determining the corresponding information as discussed in more detail below. The second image and the third image may be taken before the first image is taken in real time.

The controller 108 may correlate the slot position information, the slot orientation information, the z-axis information, and the seal orientation information to the global coordinate system to determine a primary control path for insertion for the robotic arm 102 to insert the seal 136 into the slot 124 of the engine element 122. In some embodiments, the controller may correlate the slot position information, the slot orientation information, the z-axis information, and the seal orientation information to provide the additional information in generating the insertion path for the seal 136. By "correlate" it is meant that the controller 108 may receive or determine the above information and translate the information into positions in the common coordinate system for the system 100 to utilize for insertion. The controller 108 may form and apply control signals to cause the robotic arm 102 to move and the gripper 106 to operate according to the insertion path or the preliminary control path for insertion.

The coordinates discussed herein, specifically positional coordinates of the system 100 or any of the discussed components, the robotic arm 102 at rest may be substantially perpendicular to the ground. This axis is the z-axis 190 of the system 100. The side-to-side movement of the system 100 is the y-axis 192 of the system 100. The forward and backwards movement of the system 100 is the x-axis 194 of the system 100.

It will be appreciated that the coordinates discussed herein, specifically rotational coordinates of the system 100 or any of the discussed components, rotational positioning, such as tilting of the various structures described herein, may be considered as having corresponding rotational coordinates. As shown in FIG. 1, a seal 136 gripped within the gripper 106 is illustrated. Any rotation about the z-axis, $R_z$, for example, may be considered as having corresponding z-axis rotational coordinates. Similarly, any rotation about the y-axis, $R_y$, for example, may be considered as having corresponding y-axis rotational coordinates. Finally, any rotation about the x-axis, $R_x$, for example, may be considered as having corresponding x-axis rotational coordinates.

As mentioned, in order to effectively control movement of the robotic arm, an insertion path is determined. The insertion path defines a series of movements based upon coordinates. In aspects, the correlation process ensures that information used to form the insertion path is in terms of coordinates from a global coordinate system. For example, coordinate information needed to form the insertion path concerning the slot 124 is determined in terms of the gripper-based coordinate system. In this case, the slot coordinates from the gripper-based coordinate system are translated to conform to corresponding coordinates in the global coordinate system. This translation may be made according to predetermined rules or other translation relationships (e.g., stored in a memory device) and performed automatically as various types of information are correlated to form the insertion path. In one specific example, rules may specify adding a first offset to gripper based x-coordinates, a second offset to gripper-based y-coordinates, and a third offset to gripper based z coordinates to translate gripper based coordinates of the slot from the gripper based coordinate system to the global coordinate system.

For example, the system knows the relationship between the gripper coordinate system and the global coordinate system. Once an image is taken and processed using the techniques described herein, in some instances, resulting coordinates may be known in terms of and/or relative to the gripper coordinate system but not the global coordinate system. Because the system knows the relationship between the gripper coordinate system and the global coordinate system, a translation can be applied to the resulting coordinates to be provided in terms of and/or relative to the global coordinate system. As described above, this may be done automatically using rules and/or translations.

Referring now to FIGS. 2A to 2D, one example of a system 200 for automated part insertion or placement of components at or into another part is described, similar to that described in FIG. 1. The system 200 includes a controller (e.g., a processor) 208, a robotic arm 202, a second sensor 228, a motor 218, and a third sensor 214. The system may further include a communication link 226 between the controller 208 and the second sensor 228, a communication link 212 between the controller 208 and the motor 218, and a communication link 216 between the second sensor 228 and the controller 208. The controller 208 is similar to that described above with reference to FIG. 1. The system 200 may further include a docking station 242 to hold a gripper 206 containing a first sensor 204.

Within a vicinity of the system 200, a carrier 220 containing engine elements 222 having a slot 224 or other openings may be provided. Further, a bin 234 containing seals 236 may be provided within a vicinity of the system 200.

The controller 208 may be coupled to the motor 218, the third sensor 214, and the second sensor 228 via the communication links described above. It will be appreciated that as used herein the term "controller" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The controller 208 may be configured (for example, by using corresponding programming stored in a memory as will be well understood by those skilled in the art) to carry out one or more of the steps, actions, and/or functions described herein, such as image analysis techniques including computer vision and/or machine vision techniques. The controller 208 may include a memory that includes computer instructions that implement any of the functions described herein. In some embodiments, the controller 208 may be coupled to the communication links 212, 216, and/or 226. This may allow for the controller 208 to send control signals across the communication links 212, 216, and/or 226 to control a movement or operation. In some embodiments, the controller 208 may be physically coupled to one or more of the motor 218, the robotic arm 202, and second sensor 228.

The communication links 212, 216, and/or 226 may be a wired or wireless connection for control signals from the controller 208 to be communicated. Examples of a wireless connection, or communication network, may include LAN, WAN, Internet, Wi-Fi, Bluetooth, or some other wireless connection. In some other embodiments the elements may be configured for wired, wireless, optical, fiber optical cable, satellite, or other such communication configurations or combinations of two or more of such communications.

Similar to FIG. 1, the first sensor 204 may be referred to as the first sensor, the onboard sensor, or the insertion sensor. Likewise, the third sensor 214 may be referred to as the third sensor, the global sensor, or fixed sensor. The second sensor 228 may also be referred to as the inspection sensor. The first sensor 204, the second sensor 228, and/or the third sensor 214 may be an optical sensor such as a camera. Further, first sensor 204, the second sensor 228, and/or the third sensor 214 may be a monocular camera. The first sensor 204, the second sensor 228, and/or the third sensor 214 may provide 2-dimension images. The second sensor 228 may also include a laser to provide depth and/or distance information.

FIGS. 2A to 2D illustrate the operations of the robotic arm 202 gripping a seal 236 from a bin 234 and in accurately inserting the seal 236 into a slot 224 of an element 222 or part are described. The movement of the robotic arm 202 is determined, adjusted, and/or changed according to positions (as described in the common coordinate system) of the slot 224 within the element 222, the orientation of the seal 236 within a gripper 206, to mention two examples.

The controller 208 may include calibration data in its memory. In aspects, the calibration data includes the known position or coordinates of the robot origin or physical base of the robot (where these coordinates are described with respect to the global coordinate system), and a known location and/or position of a face plate 203 of the robotic arm 202 (also described with respect to the global coordinate system). The face plate 203 of the robotic arm 202 may be physically located at the end of the robotic arm 202 where the second sensor 228 and the first sensor 204 are coupled to the robotic arm 202 and define a gripper and/or a robotic arm coordinate system. These known locations and positions as well as other known information, including for example, known parameters of the sensors, known distances between the sensors and the face plate 203, as well as known lengths of certain slots, components, seal, and element, and finally, known reference markings or reference openings are utilized throughout the approaches described herein.

The second sensor 228 may be coupled to the robotic arm 202. In some embodiments, similar to the one illustrated in FIGS. 2A to 2D, the second sensor 228 and the gripper 206 may be detachably coupled to the robotic arm 202 such that the robotic arm 202 may couple one or both of the second sensor 228 and the gripper 206. In some other embodiments, the second sensor 228 may be utilized separate from the gripper 206 and the first sensor 204. In these embodiments, the gripper 206 or the second sensor 228 may be placed on the docking station 242 when not coupled to the robotic arm 202. The gripper 206 and the second sensor 228 may couple to the robotic arm 202 using magnets or mating couplers.

The gripper 206 and first sensor 204 may be coupled to one another such that the first sensor 204 is disposed within or coupled to the gripper 206. In some embodiments, the first sensor 204 may be attached to the gripper 206. In some embodiments, the first sensor 204 may be coupled to the robotic arm 202. The gripper 206 may include a tweezer portion for grasping or pinching an object. The gripper 206 may be coupled to the controller 208 via communication link 210.

The gripper 206 is a mechanical element that is configured to grasp, hold, and/or grip components or parts such as seals 236. For instance, the gripper 206 may include two or more pinching members, a first member and a second member, between which another component may be gripped, held, or secured. The gripper 206 may also grip in other ways besides pinching elements. For example, the gripper 206 may hook or loop a component around one or both of the pinching members.

The third sensor 214 may be coupled to the controller 208 via communication link 216. The third sensor 214 may be spaced apart or adjacent to one or more of the motor 218, the robotic arm 202, and the gripper 206 and/or the first sensor 204 within the vicinity of the system 200. In some embodiments, the third sensor 214 may be coupled to one or more of the motor 218, the robotic arm 202, and the gripper 206 and/or the first sensor 204.

The carrier 220 may be moved into the vicinity of the system 200 via a conveyor belt or other movement mechanism or apparatus. Similarly, the bin 234 may be moved into the vicinity of the system 200 via a conveyor belt or other movement mechanism or apparatus. The carrier 220 may include one or more elements 222 placed inside of the carrier 220. Each element 222 may contain one or more slots 224. The bin 234 may include one or more seals 236 placed inside of the bin 234. The carrier 220 and the bin 234 may also be moved manually, or by some combination of mechanical or manual movement.

As mentioned previously, the image analysis methods discussed and utilized herein determine absolute coordinates (described by a common coordinate system) or robotic arms, gripper devices, seals, and/or parts. In determining these coordinates various computer vision and/or machine vision techniques can be utilized.

The system 200 may acquire one or more images, locate an object and/or aspect within the image, determine the object's position and orientation, translate the determined position and orientation to the system's 200 coordinate system, transmit this location or position to the system 200, and adjust the system 200 accordingly to move or perform a function.

In use, as illustrated in FIG. 2A, the second sensor 228 is coupled to the robotic arm 202. In some embodiments, the second sensor 228, the gripper 206, and first sensor 204 may all be simultaneously attached to the robotic arm 202 such that they may be permanently attached to the robotic arm 202.

The system 200, via the controller 208, may cause the robotic arm 202 to move adjacent to the carrier 220 through the use of the motor 218 and/or the controller 208 via control signals communicated through the communication link 212. This positions the robotic arm 202 relative to the carrier 220 such that the robotic arm 202 can reach and seize seals 236 in the carrier 220. The carrier 220 may be moved to a location or position having a known location to the system 200.

The controller 208 may send control signals that cause the second sensor 228 to take or obtain an inspection image of the element 222 and the slot 224. The second sensor 228 may also use laser beams emitted a laser device to sense a z-axis distance 230 between the second sensor 228 and the slot 224 and/or element 222. This may include the depth between the robotic arm 202 and/or the second sensor 228 and the element 222 and/or the slot 224.

The controller 208 sends control signals to the second sensor 228 via communication link 226 to cause the second sensor 228 to capture an image. A laser device (associated with or incorporated with the second sensor 228) emits a laser beam and the controller 208 determines the distance between the second sensor 228, and in turn the laser device, and the element/part from this operation. In more detail the laser device projects the laser beam onto the element 222. The laser beam is then reflected or returned to the laser device and a z-axis distance 230 between the element 222 and the second sensor 228 is determined. This z-axis distance 230 may also include, or the controller 208 may determine, a laser plane of the element 222 as compared to the ground or another known reference plane. This z-axis distance 230 helps define information regarding the orientation of the slot, or the tilt of the element (e.g., the seal). The z-axis distance 230 may be determined without the use of the CAD file.

In acquiring the image, the controller 208 sends control signals to cause the second sensor 228 to capture the image (the inspection image). The controller 208 analyzes the inspection image such that the edges of the slot 224 in the inspection image are detected. In detecting the edges of the slot 224, the controller analyzes the pixels of the image to determine a different in the color of the pixels, i.e., determining the difference between light and dark pixels. In one example, a sharp change from bright pixels to dark pixels in the image indicates the presence of an edge in the image.

The controller 208 compares the inspection image to an image in a CAD file (or other similar file) of a known element having a known slot. The element in the CAD file is referenced, positioned, and/or described with respect to a known origin point.

The object in the CAD file will be sized with respect to the object in the captured image. The purpose of the sizing operation is to associate the known coordinates and/or position of elements in the CAD file to the similar elements in the captured image. The captured image includes a known pixel size. The pixel size is known due to known parameters of the second sensor 228, i.e., the size of the second sensor, the lens parameters thereof, and the position of the second sensor 228 as compared to the robotic arm 202.

The object in the CAD file is sized to match the object in the inspection image, and in doing so, the object in the CAD file and its corresponding origin (and coordinate system) is aligned with the object in the inspection image and the laser plane. The size matching and laser plane referencing provides the location or position information and orientation information of the slot. The location or position plane information and orientation of the slot is with respect to the common coordinate system.

Additionally, or alternatively, the controller 208, utilizing machine vision techniques may identify the slot 224 and/or the element 222 within the image by comparing the inspection image to a reference image, similar to the CAD file described above. The positions of objects in the inspection image may additionally or alternatively be compared to a known reference mark on actual devices, discussed in more detail below. Objects in the inspection image may additionally or alternatively be compared to known objects in a CAD file (or other similar file or data structure). In these regards, an object in the inspection image may be aligned (or matched) with the known object in the CAD file, and/or reference marks such that dimensions, positions, and/or coordinates the slot 224 may be determined The controller 208 may align the inspection image with the reference image and/or reference marks having known locations and determine the location of the element 222 and/or the slot 224 relative to the robotic arm 202 and the orientation of the element 222 and/or the slot 224. This operation may include determining the position coordinates of the location of the element 222 and/or the slot 224 as well as determining the orientation or tilt of the element 222 and/or the slot 224 relative to the robotic arm 202.

As illustrated in FIG. 2B, the second sensor 228 may be detached from the robotic arm 202, or an end thereof, which allows for the gripper 206 and first sensor 204 to be attached at the docking station 242. In some embodiments, the robotic arm 202 may have the second sensor 228, the gripper 206, and the first sensor 204 attached simultaneously at one time.

Figure 2C:
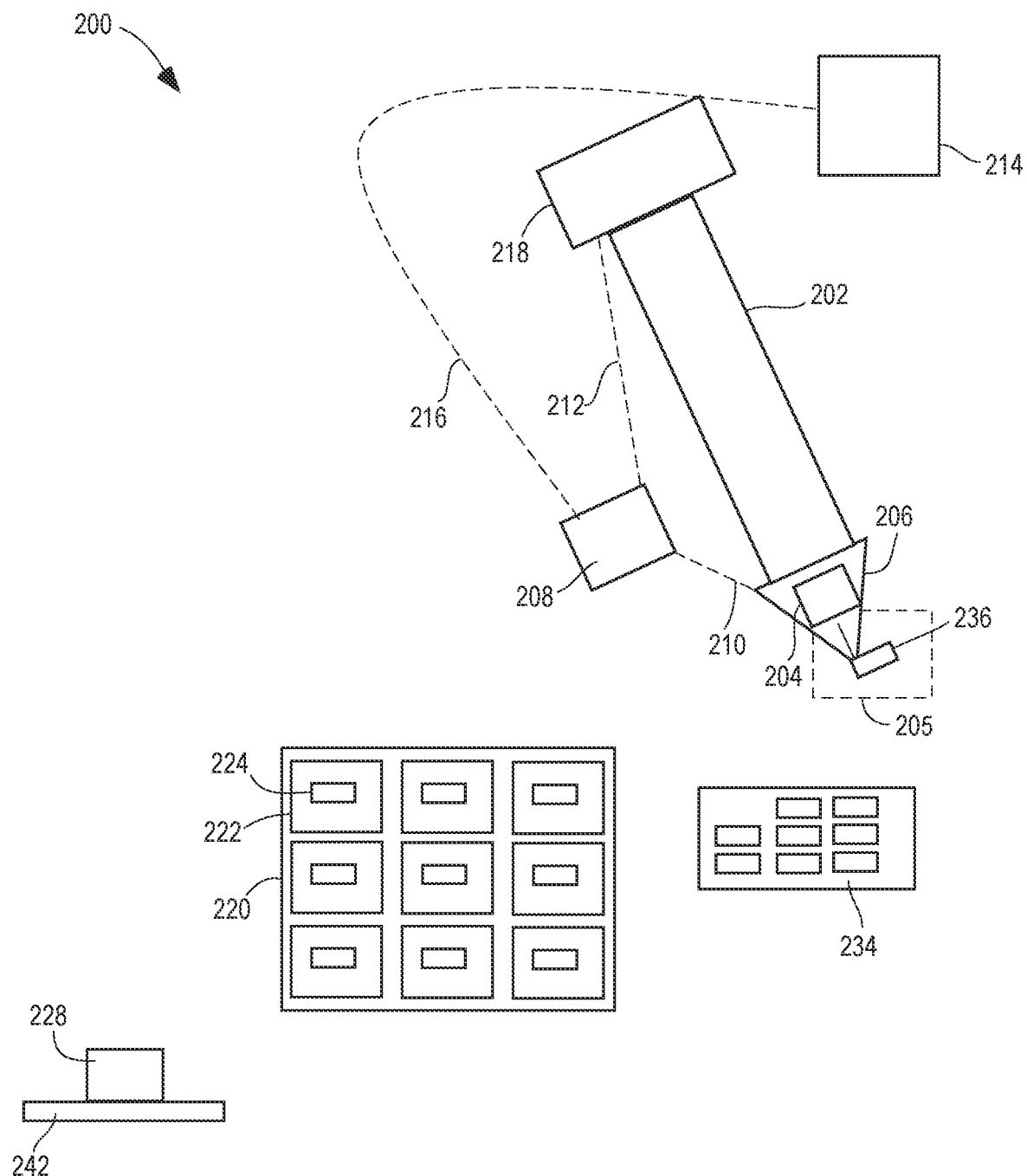
FIG. 2C comprises a diagram as configured in accordance with various embodiments of these teachings.

As illustrated in FIG. 2C, the robotic arm 202 is moved to the bin 234 through the use of the motor 218 and/or the controller 208 via control signals communicated through the communication link 212. The bin 234, similar to the carrier 220 may have, or be placed in, a known location or position to the system 200, allowing for movement of the robotic arm 202 relative to the bin 234. The system 200 may cause the gripper to perform a function, such as grasping or gripping the seal 236, then removing the seal 236 from the bin 234, or from another location such as a transfer station. To perform this function, the controller 208 forms and transmits control signals that are communicated through the communication link 210 to the gripper 206. The system 200 may cause the robotic arm 202, while the gripper 206 is gripping the seal 236, to move and/or rotate substantially underneath or adjacent to the third sensor 214. The system 200 may cause the gripper 206 to rotate relative to the third sensor 214.

The controller 208 may cause the third sensor 214 to take or obtain a gripped image of the seal 236 within the gripper 206. The gripper 206 may contain reference marks and/or reference openings on a surface of the gripper 206 or contained within the gripper 206. The gripper 206 may be rotated such that the reference marks or the openings are aligned perpendicular to the third sensor 214 when the gripped image is obtained, similar to that illustrated in FIGS. 3C and 4B. The gripper 206 may be backlit such that light is permitted to pass through the reference openings in the gripper 206, allow the proper alignment between the gripper 206 and the third sensor 214. The image may be transmitted to the controller 208 via the communication link 216. The communication link 216 may be a wired or wireless connection.

The controller 208 utilizes image analysis techniques to analyze the gripped image. These image analysis techniques relating to analyzing the gripped image are similar to those described above with reference to FIG. 2A. From the gripped image, the controller 208 determines a virtual plane 205 within a workspace under the third sensor 214. The plane is selected using camera calibration information that establishes the pixel size for the image, including a scaling value. The plane is thus selected based upon known values, such as a known distance between the third sensor 214 and the plane. The plane also may be selected based on a known distance between the plane and the third sensor 214, the robotic arm 202, or the robot origin. The purpose of selecting a plane is to provide another known aspect for the system to utilize.

Once the plane is determined, the gripper 206 moves under the third sensor 214 on the plane. The distance between the third sensor 214 and the gripper 206 is known because the gripper 206 has been moved to the known plane. The controller 208 compares an object in the gripped image to a corresponding object represented in a CAD file. Similar to the process described above, the image of the object in the CAD file is size matched to the image of the object in the gripped image. The controller 208 includes in its memory known parameters of the third sensor 214 to determine a pixel size for the gripped image. The controller 208 may identify the reference openings of the gripper 206, described in more detail below, and in matching the CAD to the gripped image, determine a seal orientation of the seal 236 within the gripper 206. The seal orientation may be the angle, rotation, and/or relative position of the seal 236 within or with respect to components of the gripper 206.

In some embodiments, the controller 208 may determine the coordinates or the position of the seal 236 within the gripper 206 using computer vision, such as where the seal is located in relation to the gripper 206. This may also include coordinates or positions such as the y-axis position of the seal 236 within the gripper 206, i.e., where the gripper 206 has gripped the seal 236 along the length of the seal 236. The controller 208 may compare a reference image, similar to the CAD file described above, and/or the calibration data or coordinates of the gripper 206 relative to the third sensor 214 to determine the orientation of the seal 236, e.g., the tilt of the seal 236 in the gripper 206. The controller 208 may additionally or alternatively utilize a known length or size of the seal 236.

Figure 2D:
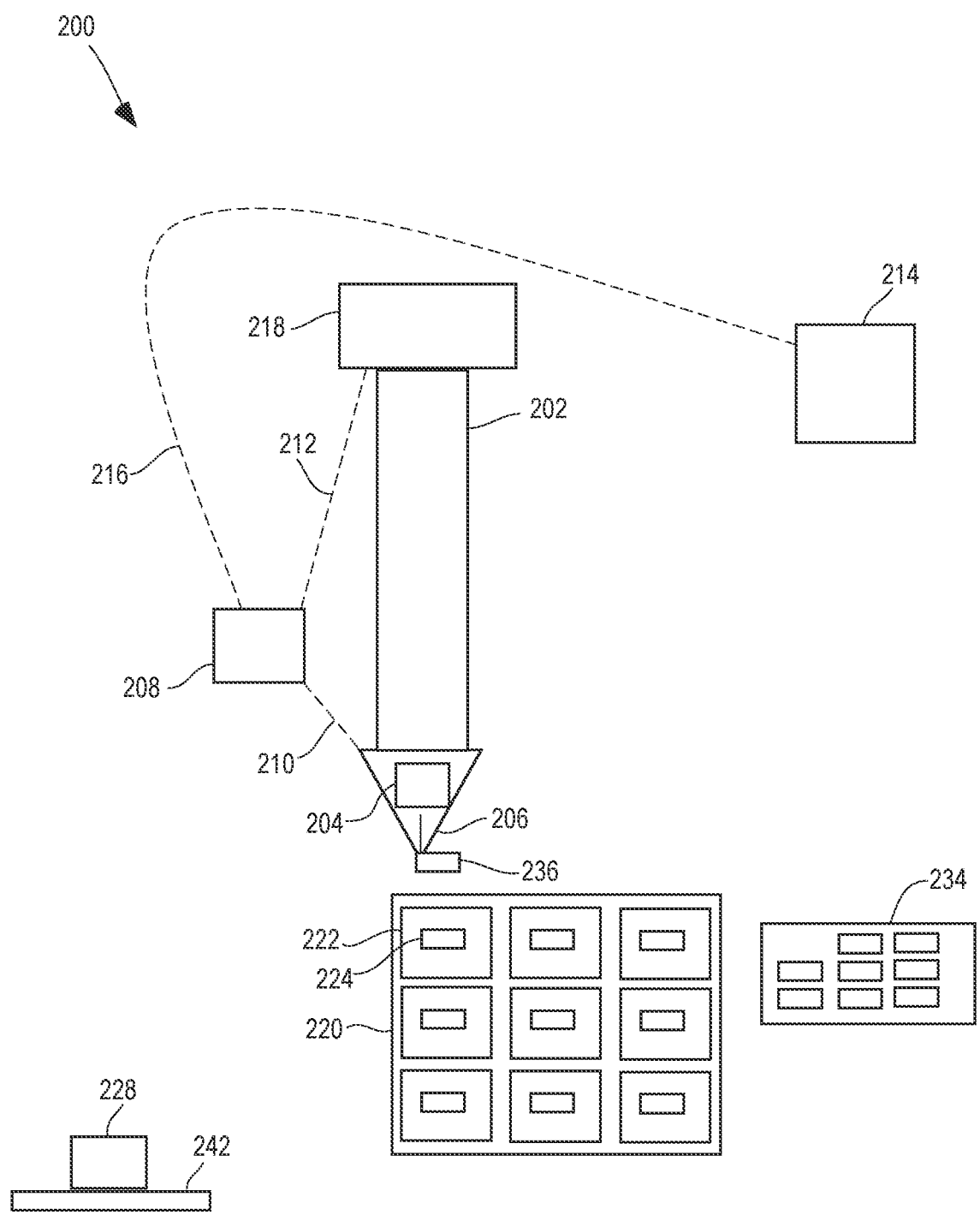
FIG. 2D comprises a diagram as configured in accordance with various embodiments of these teachings.

As illustrated in FIG. 2D, the robotic arm 202 and gripper 206 are moved close to the slot 224, in some examples, about 10 mm (or less) away, through the use of the motor 218 and/or the controller 208 via control signals communicated through the communication link 212 and the communication link 210 respectively. As discussed above, the location of the carrier 220, the element 222, and the slot 224 are known to the controller 208. The controller 208 sends control signals that cause the first sensor 204 to take or obtain an insertion image of one or more of the element 222, the slot 224, the gripper 206, and the seal 236.

In some embodiments, the controller 208, for example, utilizing computer vision and/or machine vision techniques may determine an insertion path based on the information described above, such as the coordinates and/or orientation of the above discussed elements, the controller 208 determined from the inspection image, the gripped image, and any reference images, reference marks, locations, positions, and/or lengths used. The robotic arm 202 may be moved via the preliminary control path for insertion to reach a point near insertion, for example, about 10 mm away (or less) from the slot 224. In some embodiments, the controller 208 may move the robotic arm 202 near the known location of the element 222 within the carrier 220, about 10 mm away (or less) from the slot 224 without determining the preliminary control path for insertion. In some of the embodiments not utilizing the preliminary control path for insertion, the system 200 moves the robotic arm within about 10 mm (or less) of the slot 224 using the known location of the slot 224 from the inspection image. In some other embodiments, a human operator may cause the robotic arm 202 to move near insertion before the insertion image is captured.

The insertion path, which in some embodiments may include the preliminary control path for insertion, may include coordinates obtained by a chain of spatial calculations based on the relative positions and locations of the discussed components (e.g., the slot 224, the seal 236, and the gripper 206). The insertion path may be determined to position the robotic arm 202 near the point of insertion. The preliminary control path for insertion may be revised, updated, or corrected using additional information from the insertion image.

The insertion image is transmitted to the controller 208 via the communication link 210. The communication link 210 may be a wired or wireless connection. The controller 208 determines the position of the slot 224 relative to the gripper 206. The controller 208 may determine corrected coordinates of the gripper 206 relative to the slot 224. The corrected coordinates allow the system to determine an insertion path, or an updated insertion path based on the preliminary control path for insertion, for the seal 236 into the slot 224.

The controller 208 utilizes image analysis techniques to analyze the insertion image. These image analysis techniques relating to the insertion image are similar to those described above with reference to FIG. 2A. The controller 208 utilizes known parameters of the first sensor 204, e.g., the lens size, the distance between the first sensor 204 and the robotic arm 202, and the tilt of the first sensor 204 to determine slot position information. The insertion image includes at least the slot 224, the gripper 206, and the seal 236. The gripper 206 includes references markings on a surface thereof. The position of the gripper 206 (in the known coordinate system) is known to the controller 208 from calibration data obtained before the process described in FIGS. 2A-2D in initiated. Because the location or position of the gripper 206 is known, the reference marks on the gripper 206 also have a known location.

The insertion image is obtained by the first sensor 204. The controller 208 analyzes the image to determine the edges of the slot 224 within the insertion image. The controller 208 compares the image of the slot 224 insertion image to a corresponding image or representation of the slot in a CAD file. Similar to the process described above, the image of the slot in the CAD file is size matched to the image of the slot in the insertion image.

As mentioned, the controller 208 includes in its memory known parameters of the first sensor 204 to determine a pixel size for the insertion image. The controller 208 may identify the reference marks of the gripper 206, and in matching the image of the slot in the CAD file to the image of the slot in the insertion image (and a known origin of the objects in the CAD file), the controller 208 determines and/or updates the slot position and coordinate information, e.g., the location and/or coordinates of the slot 224 relative to the gripper 206 and/or the robot origin. These coordinates are consistent with coordinates in the global coordinate system as described herein.

The controller 208 may move the gripper 206 accordingly, e.g., move the gripper 206 to align with the position of the slot 224 for insertion of the seal 236. More specifically, the controller 208 utilizes the slot position and/or coordinate information from the insertion image, as well as the information determined from the inspection image and the gripped image, as discussed above and below, to finalize, create, and/or adjust an insertion path. The insertion path is transmitted to the robotic arm 202 and gripper 206 via communication links 212 and 210 to control a motion and a function and/or operation to insert the seal 236 into the slot 224. The insertion path may be a list of coordinates that describe the path to be taken by the robotic arm in inserting the seal into the component. The coordinates formed may be directly used in controlling action of the robotic arm. Alternatively, the coordinates may describe a mathematical relationship that can be determined and used to describe the insertion path.

The controller 208 may utilize the insertion path, which may include the preliminary control path for insertion, to insert the seal 236 into the slot 224. Once the insertion path is finalized, determined, and/or adjusted, the controller 208 may cause motion of the robotic arm 202, via the motor 218, and an operation of the gripper 206 to insert the seal 236 into the slot 224.

In other aspects, the controller 208, utilizing machine vision techniques may identify reference markings on the gripper 206 and identify the slot 224 to locate the position of the gripper 206 relative to the slot 224. The controller 208, from the inspection image, may utilize the z-axis distance 230 or position, such that the controller 208 knows the depth of insertion. The controller 208 may update the positioning of the gripper 206 relative to the slot 224. For example, this may include moving the gripper 206 forward or backward along the x-axis, as well as the side-to-side along the y-axis (left or right) relative to the slot 224. This is done by utilizing computer vision and/or machine vision techniques in combination with the position and orientation received from the above images and the insertion image. The controller 208 may also rotate or tilt the gripper 206 along the $R_Z$ orientation to adjust the insertion of the seal 236 into the slot 224. This may be done using the gripped image and orientation of the seal 236, determined by the controller 208 from the gripped image. For example, if the seal 236 is angled, the controller 208, using the gripper image, may adjust the gripper 206 accordingly before insertion.

Figure 3A:
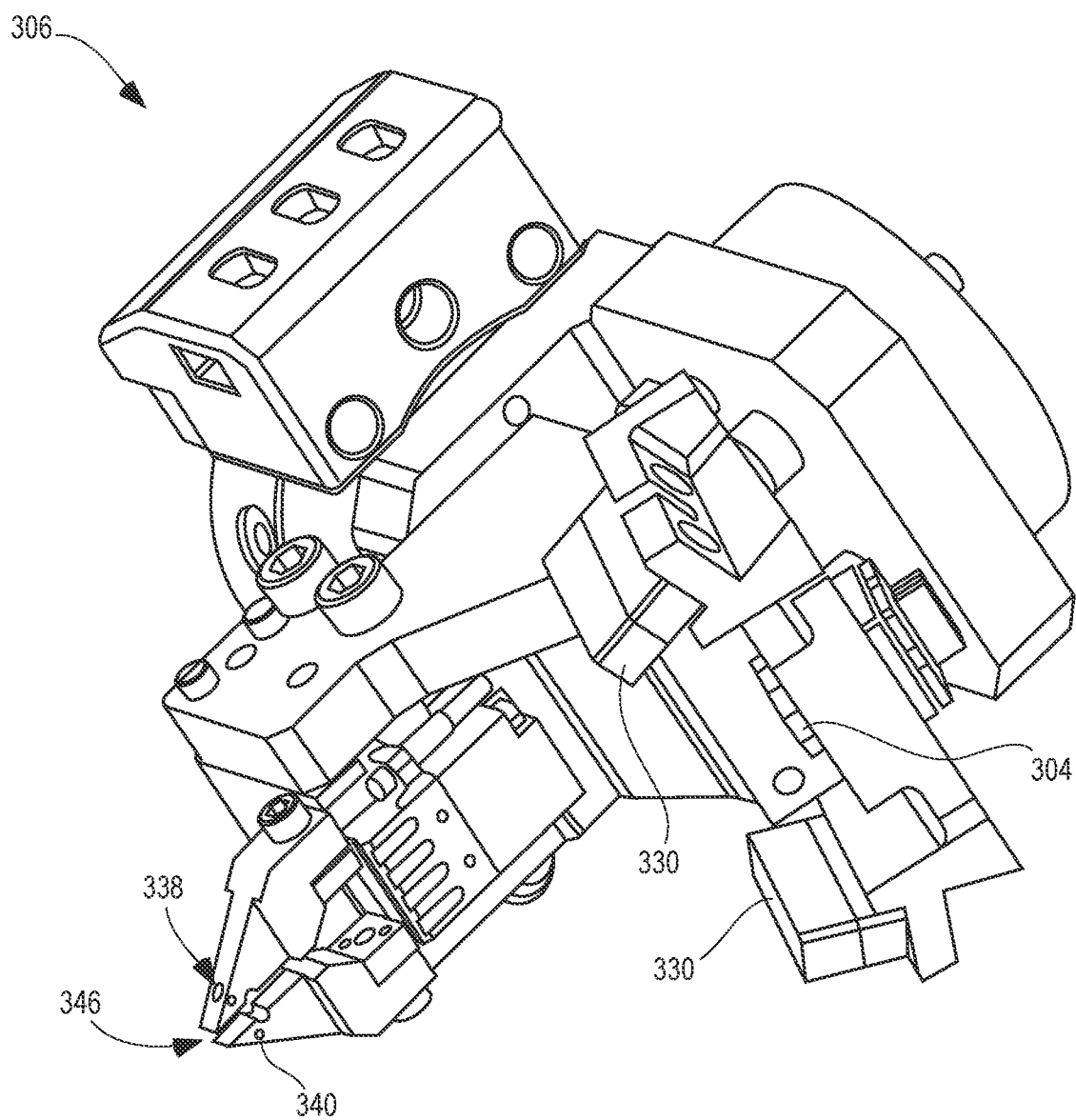
FIG. 3A comprises an illustration as configured in accordance with various embodiments of these teachings.
Figure 3B:
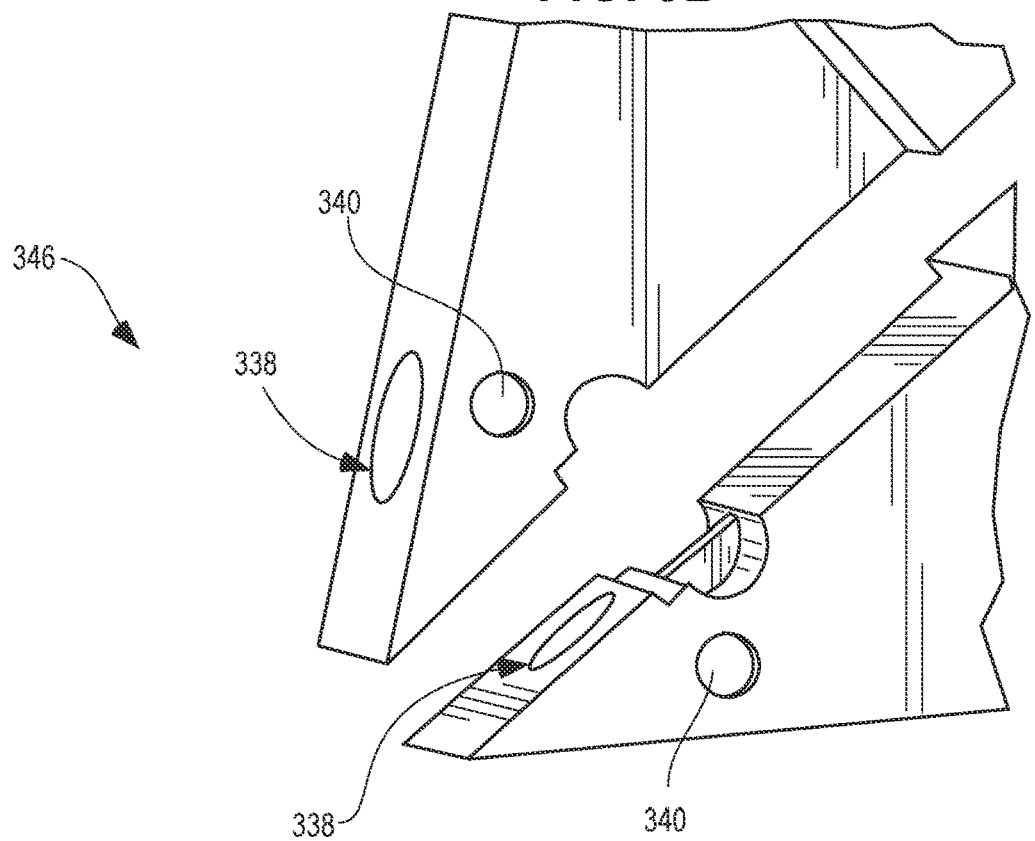
FIG. 3B comprises an illustration as configured in accordance with various embodiments of these teachings.
Figure 3C:
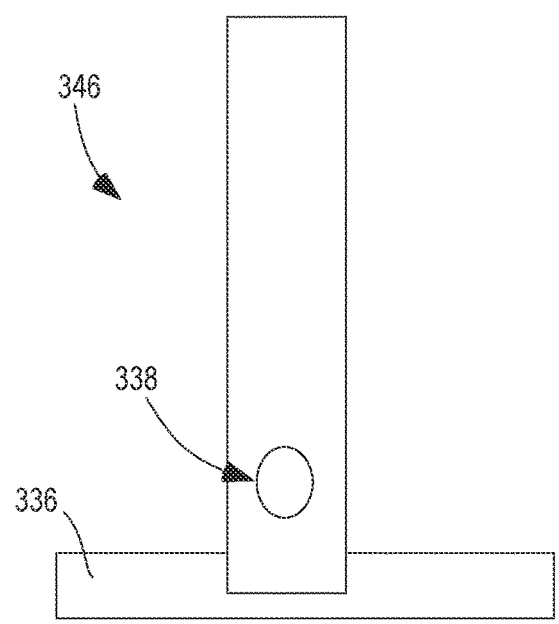
FIG. 3C comprises an illustration as configured in accordance with various embodiments of these teachings.

Referring now to FIGS. 3A to 3C, a gripper 306 is illustrated. The gripper 306 may include a first sensor 304. The gripper 306 includes gripper lights 330, tweezers 346, reference openings 338, and reference markings 340. The gripper 306, the first sensor 304, reference openings 338, and the reference markings 340 are similar to those described elsewhere herein and their descriptions will not be repeated here. The tweezers 346 may include two or more pinching members for gripping or grasping a seal.

The tweezers 346 are used to pick up a seal 336 or other component using the pinching members. The reference openings 338 and/or the reference markings 340 may be used to provide points of reference for the system to determine positions, locations, or to reference known locations.

Figure 4A:
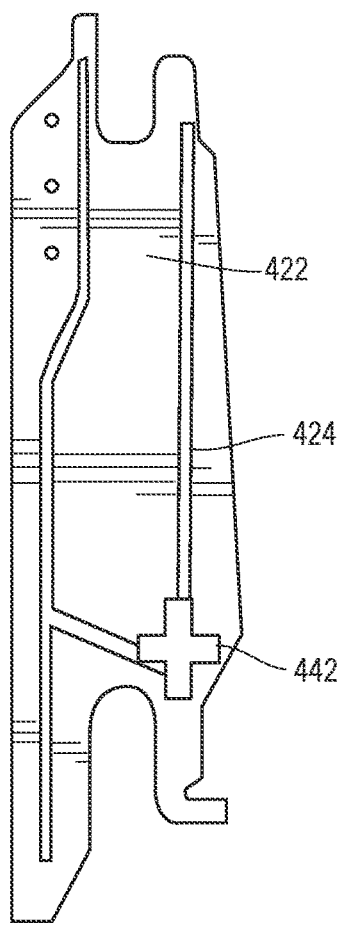
FIG. 4A comprises an illustration as configured in accordance with various embodiments of these teachings.

Referring now to FIG. 4A, an image of an engine element 422 is illustrated having a slot 424 for insertion of a seal. Examples of engine elements include different blocks, portions, or sectors of the engine or its casing. The image may be obtained using a sensor (e.g., the second sensor 228), similar to that described above. The sensor may take or obtain the image and transmit the image to a controller (e.g., controller 208). The controller may use a reference mark 442 in the image to align with the slot 424 in the image. Aligning the slot 424 in the image to the reference mark 442, a known location, in the image allows the controller to determine the location of the slot 424.

Figure 4B:
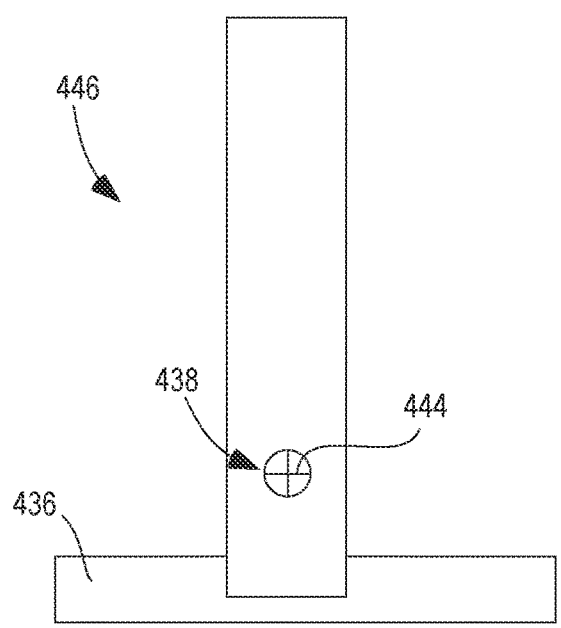
FIG. 4B comprises an illustration as configured in accordance with various embodiments of these teachings.

Referring now to FIG. 4B, an image of a gripper 406 gripping a seal 436 is illustrated. The gripper 406 may also include a reference opening 438, and tweezers 446. The image may be obtained using a sensor (e.g., the third sensor 214). The global sensor may obtain the image and transmit the image to the controller. The controller may use the reference opening 438 to align with a reference mark 444. Aligning the reference opening 438 in the image to the reference mark 444 in the image allows the controller to determine the position of the seal 436 within the gripper 406, relative to the gripper 406. The controller may utilize known lengths, positions, locations, orientations, or coordinates of the seal 436, as well as pre-calibrated data from the gripper 406, to determine the orientation information of the seal 436 such as the tilt of the seal 436 within the gripper 406.

Referring now to FIG. 4C, an image of a gripper 406 gripping a seal 436 is illustrated at a point near insertion into the slot 424, about 10 mm apart. The image may be obtained using a sensor (e.g., the first sensor 204). The sensor may obtain the image and transmit the image to the controller. The controller may use reference marks or the reference openings 438 in the image to known locations, positions, and coordinates of the gripper 406 relative to the slot 424. Aligning the gripper 406 in the image to the known position allows the controller to determine the insertion path or update the insertion path based on the preliminary control path for insertion. The controller may utilize known lengths, positions, locations, orientations, or coordinates of the slot 424 to determine the updated information.

The insertion path includes or utilizes coordinates obtained through a chain or series of spatial calculations based on the relative positions and locations of the discussed elements. If an insertion path is determined or calculated to position the robotic arm near the point of insertion, the insertion path, based on the preliminary control path for insertion, may be revised, updated, or corrected using additional information from the image taken near the point of insertion.

Figure 5:
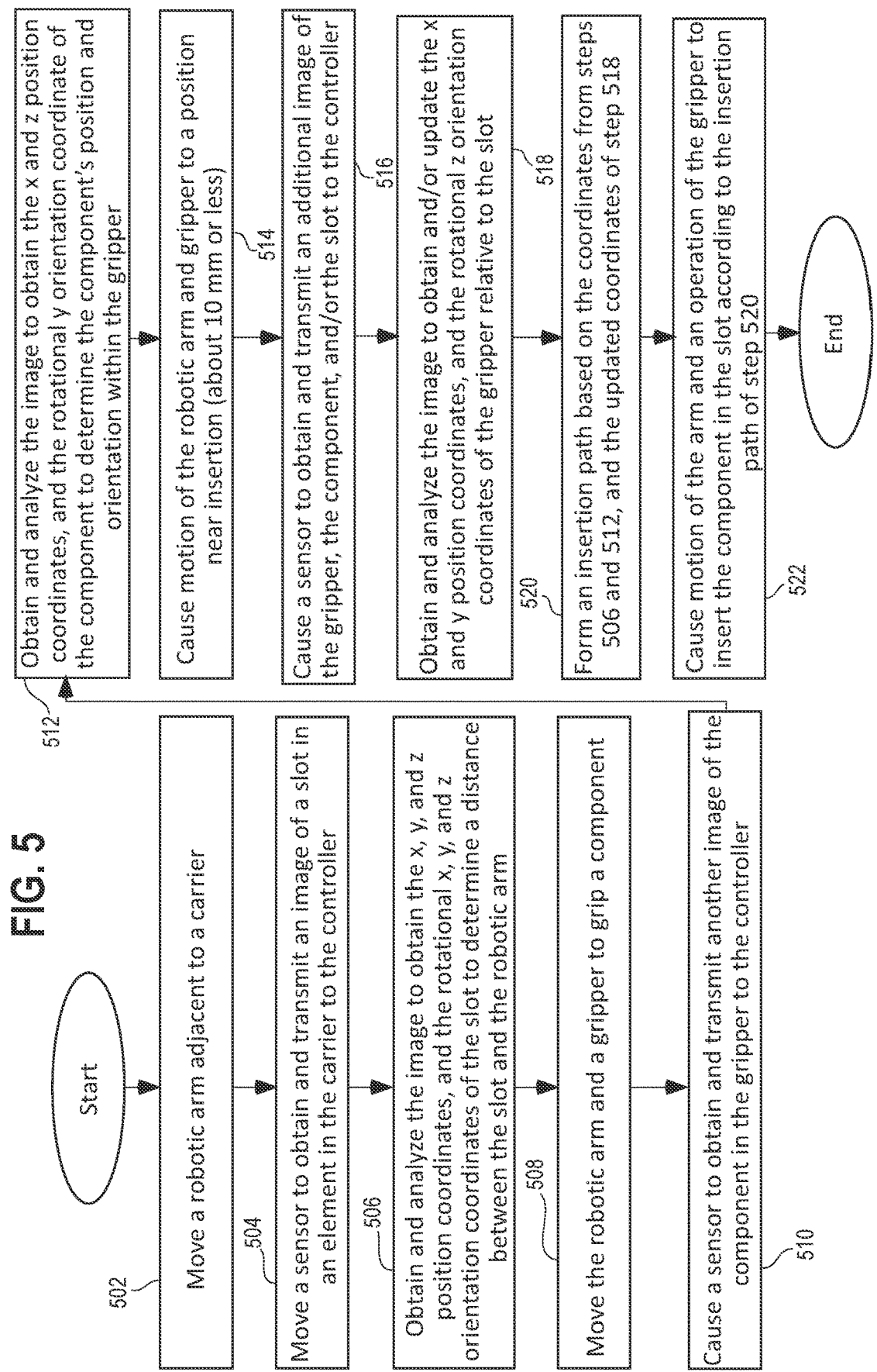
FIG. 5 comprises a flowchart as configured in accordance with various embodiments of these teachings.

Referring now to FIG. 5, an approach for inserting a seal into a slot is provided. The elements, structures, and the like used in the below discussion are similar in many respects to the above-described structures. At step 502, a controller causes a motion in a robotic arm (e.g., robotic arm 102 and 202 In FIGS. 1 and 2A to 2D, to move close to a carrier containing elements. This movement may be accomplished using a motor coupled to the robotic arm.

At step 504, the controller sends control signals that cause a sensor (e.g., the second sensor 228 in FIG. 2A) to obtain and transmit an image of a slot in the element to the controller or processor. This control signals are transmitted from the controller to the second sensor 228 along the communication link 226. The communication links may be wired or wireless.

At step 506, discussed in more detail below with reference to FIG. 6, the controller obtains and analyzes the image to determine the x, y, and z position coordinates of the slot, as well as the rotational x, y, and z orientation coordinates of the slot to determine the position of the slot and to determine the depth between the slot and the robotic arm. The coordinates determined may be coordinates in the global coordinate system.

In some embodiments the position coordinates and the rotational orientation coordinates of the element may be determined to determine the position of the element and to determine the distance between the element and the robotic arm. In examples, image analysis techniques similar to or as discussed above, including computer vision and/or machine vision techniques, are utilized to recognize features in the images obtained and based upon mathematical analysis determine distances (either relative or absolute) between features.

In one specific example, these image analysis techniques will recognize the slot and/or the element in the image. Then, these techniques can derive or transform the coordinates and/or distances between the slot and the robotic arm in the image considering the orientation of these elements in the image and known positions, shapes, and/or dimensions of these elements.

At step 508, the controller causes motion of the robotic arm and a gripper coupled to the robotic arm to grip a seal. The controller may transmit control signals to the robotic arm and/or gripper to control the motion of the robotic arm and an operation of the gripper, e.g., opening and closing the gripper to utilize pinching members. This may be done by transmitting the control signals to a motor that is coupled to the robotic arm and configured to move the robotic arm.

At step 510, the controller transmits control signals to a sensor (e.g., the third sensor 214 in FIG. 2A) that responsively causes the sensor to obtain and transmit an image of the seal within the gripper to the controller or processor.

At step 512, discussed in more detail below with reference to FIG. 7, the controller obtains and analyzes the image to obtain the x and z position coordinates of the seal within the gripper, as well as the rotational y orientation of the seal. The controller may determine and obtain the y positional coordinate of the seal within the gripper, as well as the rotational x and z coordinates of the seal within the gripper, using pre-calibrated data, similar form the described above, received from the gripper. This may allow the controller to determine the seal's position and orientation within the gripper.

In examples, image analysis techniques the same or similar to those discussed above, including computer vision and/or machine vision techniques, are utilized to recognize features in the images obtained and based upon mathematical analysis determine distances (either relative or absolute) between features and/or relative coordinate systems. In one specific example, these image analysis techniques will recognize the seal, the gripper, and/or reference openings in the image. Then, these techniques can derive coordinates and/or orientation information between the seal and the gripper considering the orientation of these elements in the image and known positions, shapes, and/or dimensions of these elements.

In some embodiments, the controller may generate the preliminary control path for insertion based on the obtained information, coordinates, position, and orientation information. The insertion path, which may include the preliminary control path for insertion, may be a chain of spatial calculations based on the relative positions and locations of the discussed elements. The preliminary control path for insertion may be utilized to position the robotic arm near the point of insertion. The preliminary control path for insertion may be revised, updated, or corrected using additional information from the image obtained in step 518 to generate, finalize, and/or adjust the insertion path.

At step 514, the controller causes motion of the robotic arm and the gripper coupled to the robotic arm to a position near insertion of the seal into the slot, in some examples about 10 mm away. This may be done by the controller sending control signals to a motor coupled to the robotic arm.

At step 516, the controller transmits control signals to a sensor (e.g., the first sensor 204 in FIG. 2C) that cause the sensor to obtain and transmit an image of the gripper, the seal, and the slot to the controller or processor. This may be done via control signals communicated through communication links between the sensor and the controller. The communication links may be wired or wireless.

At step 518, discussed in more detail below with reference to FIG. 8, the controller obtains and analyzes the image to obtain, correct, and/or update the x and y position coordinates, as well as the rotational z orientation coordinates of the gripper relative to the slot. This allows the controller to correct the positioning of the gripper relative to the slot before insertion. In examples, image analysis techniques, similar to those discussed above, including computer vision and/or machine vision techniques, are utilized to recognize features in the images obtained and based upon mathematical analysis determine distances (either relative or absolute) between features.

In one specific example, these image analysis techniques will recognize the seal, the slot, the gripper, and/or reference openings or reference markings in the image. Then, these techniques can derive or update coordinates and/or orientation information between the seal, the gripper, and/or the slot considering the orientation of these elements in the image and known positions, shapes, and/or dimensions of these elements.

At step 520, discussed in more detail below with reference to FIG. 9, the controller finalizes and/or forms the insertion path based on the coordinates from steps 506, 512, and 518. In some embodiments, the controller may update the preliminary control path for insertion using the corrected coordinates to form the insertion path.

At step 522, the controller causes a motion of the arm and an operation of the gripper to insert the seal into the slot through the use of control signals generated according to the insertion path from step 520.

Figure 6:
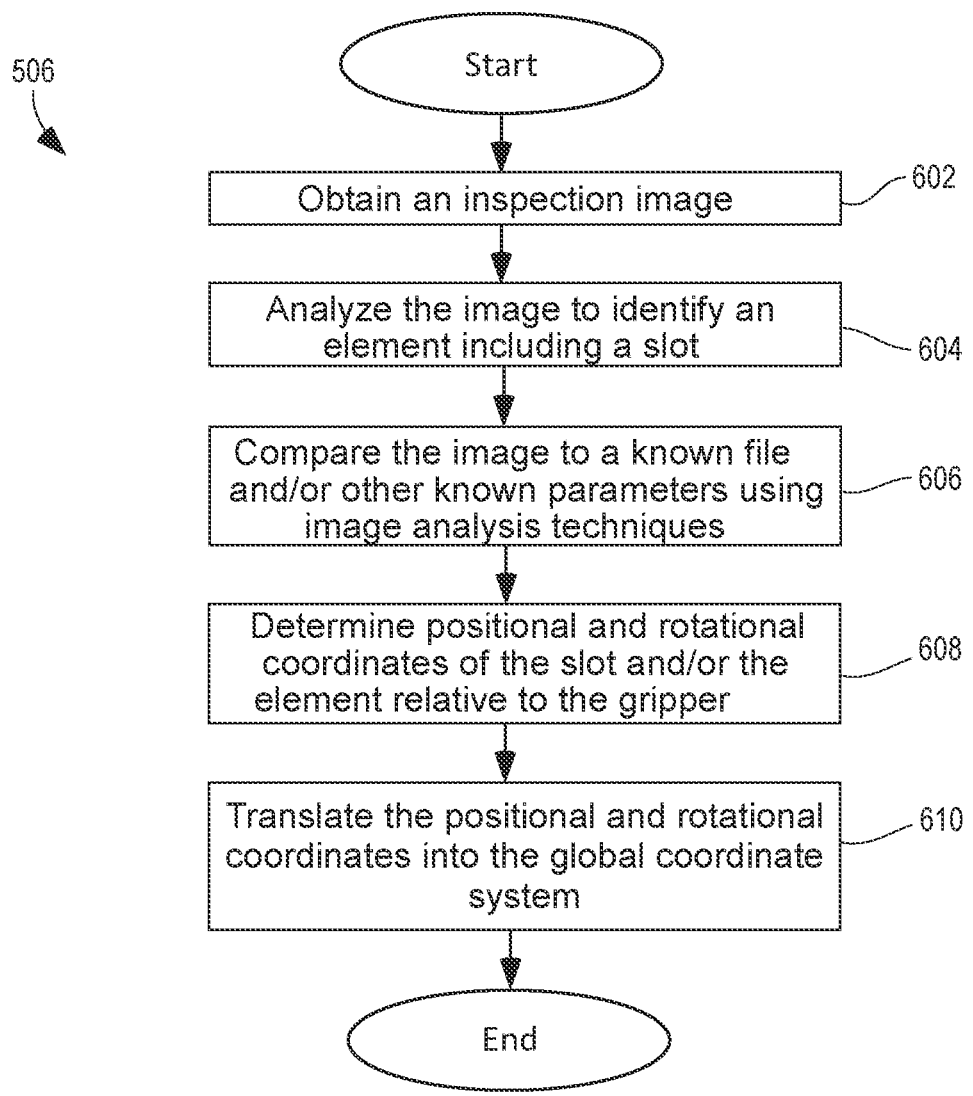
FIG. 6 comprises a flowchart as configured in accordance with various embodiments of these teachings.

Referring to FIG. 6, step 506 is described in greater detail. At step 602, the controller obtains an inspection image of the slot and the element, similar to the image of FIG. 4A, from the second sensor.

At step 604, the controller analyzes the inspection image to identify objects, elements, areas and/or structures within the inspection image. The structures identified in the inspection image include the edges of the element and/or edges of the slot within the element. In identifying the edges of the element and the slot, the controller analyzes the image for different pixel values within the image to determine the edges of the element and/or the seal. Pixel values include the associated color and/or grayscale of the pixel, a light pixel representing a surface and a dark pixel representing the lack of a surface. Sharp transitions of pixel brightness from light to dark typically indicate an edge.

At step 606, the controller compares the inspection images to a corresponding known object, element, area, or structure represented in a CAD file or similar file or data structure. In doing so, the controller size matches the object, element, area, or structure in the CAD file to the object, element, area, or structure in the inspection image. The controller utilizes known parameters of the system and second sensor in size matching, such as the known lens and distance from the second sensor to the robotic arm. Since the coordinates, dimensions, and sizing of the objects, elements, areas, or structures in the CAD file are known, the coordinates, dimensions, and sizing of the objects, elements, areas, and structures in the inspection image can be extrapolated from the known information of the CAD file.

The process of step 606 allows the controller, at step 608, also utilizing the laser plane discussed above, to determine positional and rotational coordinates of the slot and/or the element relative to the robotic arm. To be used in the correlation process, these coordinates preferably should be coordinates with respect to the global coordinate system. However, information concerning the position of the slot first determined at step 608 at is in terms of the gripper-based system. Consequently, at step 610, this information is translated into the global coordinate system as described elsewhere herein. Translation of other types of information from the gripper-based coordinate system to the global coordinate system may also occur.

Figure 7:
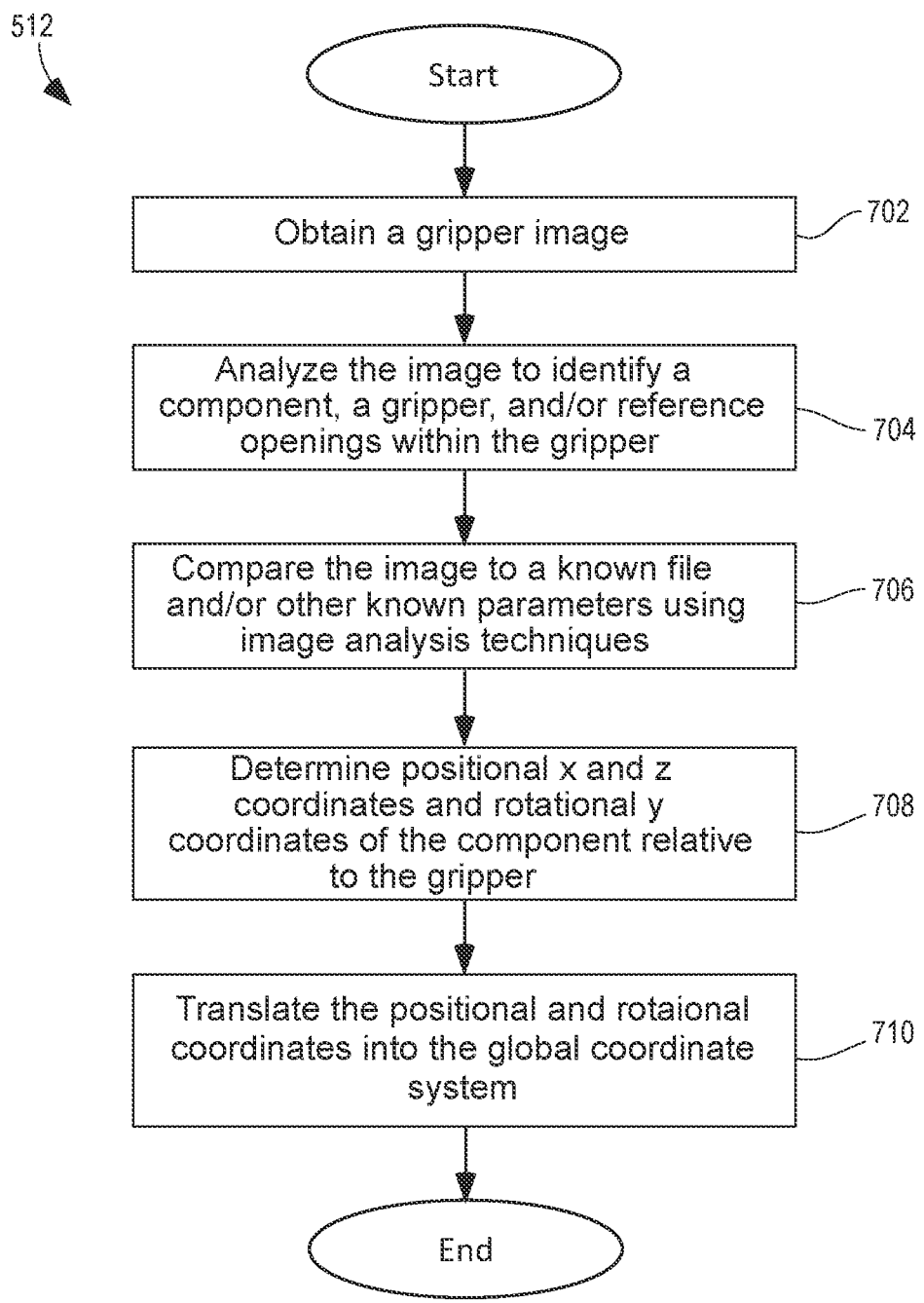
FIG. 7 comprises a flowchart as configured in accordance with various embodiments of these teachings.

Referring to FIG. 7. step 512 is described in greater detail. At step 702, the controller obtains a gripped image of the seal within the gripper, similar to the image of FIGS. 3C and 4B, from the third sensor. At step 704, the controller analyzes the global image to identify objects, elements, areas, or structures within the global image. The objects, elements, areas, or structures identified in the global image include the seal and the edges thereof within the gripper, and reference openings within the gripper. In identifying the edges of the seal, the controller analyzes the image for different pixel values within the image to determine the edges of the seal. Pixel values include the associated color and/or grayscale of the pixel, a light pixel representing a surface and a dark pixel representing the lack of a surface. As before, sharp transitions of pixel brightness from light to dark typically indicate an edge.

At step 706, using image analysis techniques, such as computer vision and/or machine vision techniques, the controller compares the global image to a known objects, elements, areas, or structures in a CAD file or similar data structure, known location of the reference openings within the gripper, and a known distance between the gripper and the third sensor. In doing so, the controller size matches the objects, elements, areas, or structures in the CAD file to objects, elements, areas, or structures in the global image. As described previously, the controller utilizes known parameters of the system and third sensor in size matching, such as the known lens and distance from the third sensor to the robotic arm and/or gripper.

The process of step 706 allows the controller, at step 708 to determine positional and rotational coordinates of the seal within the gripper, such as the x and z position coordinates of the seal within the gripper and the y-axis rotational coordinates, $R_y$. To be used in the correlation process, these coordinates preferably should be coordinates with respect to the global coordinate system. However, information concerning the position of the seal first determined at step 708 at is in terms of the gripper-based system. Consequently, at step 710, this information is translated into the global coordinate system as described elsewhere herein. Translation of other types of information from the gripper-based coordinate system to the global coordinate system may also occur.

Figure 8:
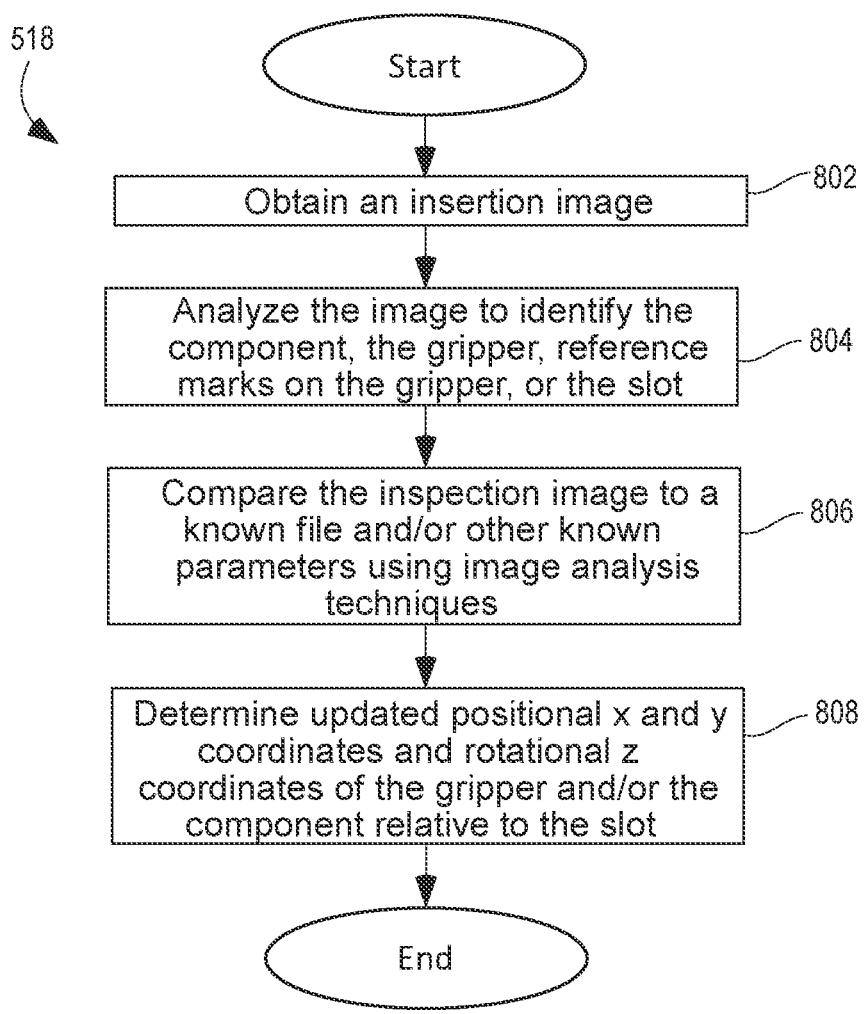
FIG. 8 comprises a flowchart as configured in accordance with various embodiments of these teachings.

Referring to FIG. 8, step 518 is described in greater detail. At step 802, the controller obtains an insertion image of the seal within the gripper near the point of insertion into the slot of the element, about 10 mm (or less) between the gripper and the slot, similar to the image of FIG. 4C, from the sensor (e.g., the first sensor 204).

At step 804, the controller analyzes the insertion image to identify objects, elements, areas, or structures within the insertion image. The objects, elements, areas, or structures identified in the insertion image include the seal, the gripper, reference marks on the gripper, and the slot and associated edges thereof. In identifying the edges of the slot, the controller analyzes the image for different pixel values within the image to determine the edges of the slot. Pixel values include the associated color and/or grayscale of the pixel, a light pixel representing a surface and a dark pixel representing the lack of a surface. As before, sharp transitions of pixel brightness from light to dark typically indicate an edge.

At step 806, using image analysis techniques, such as compute vision and/or machine vision techniques, the controller compares the objects, elements, areas, or structures in the inspection image to known objects, elements, areas, or structures in a CAD, file known location of the reference marks on the gripper, and a known distance between the gripper and the sensor (e.g., the first sensor 204). In doing so, the controller size matches known objects, elements, areas, or structures in the CAD file to actual objects, elements, areas, or structures in the insertion image. The controller utilizes known parameters of the system and sensor in size matching, such as the known lens and distance from the sensor to the robotic arm and/or gripper.

The process of step 806 allows the controller, at step to determine positional and rotational coordinates of the seal, the gripper, and/or the slot, such as the x and y positional coordinates of the gripper, the slot, and/or the seal and z-axis rotational coordinates, $R_z$.

Figure 9:
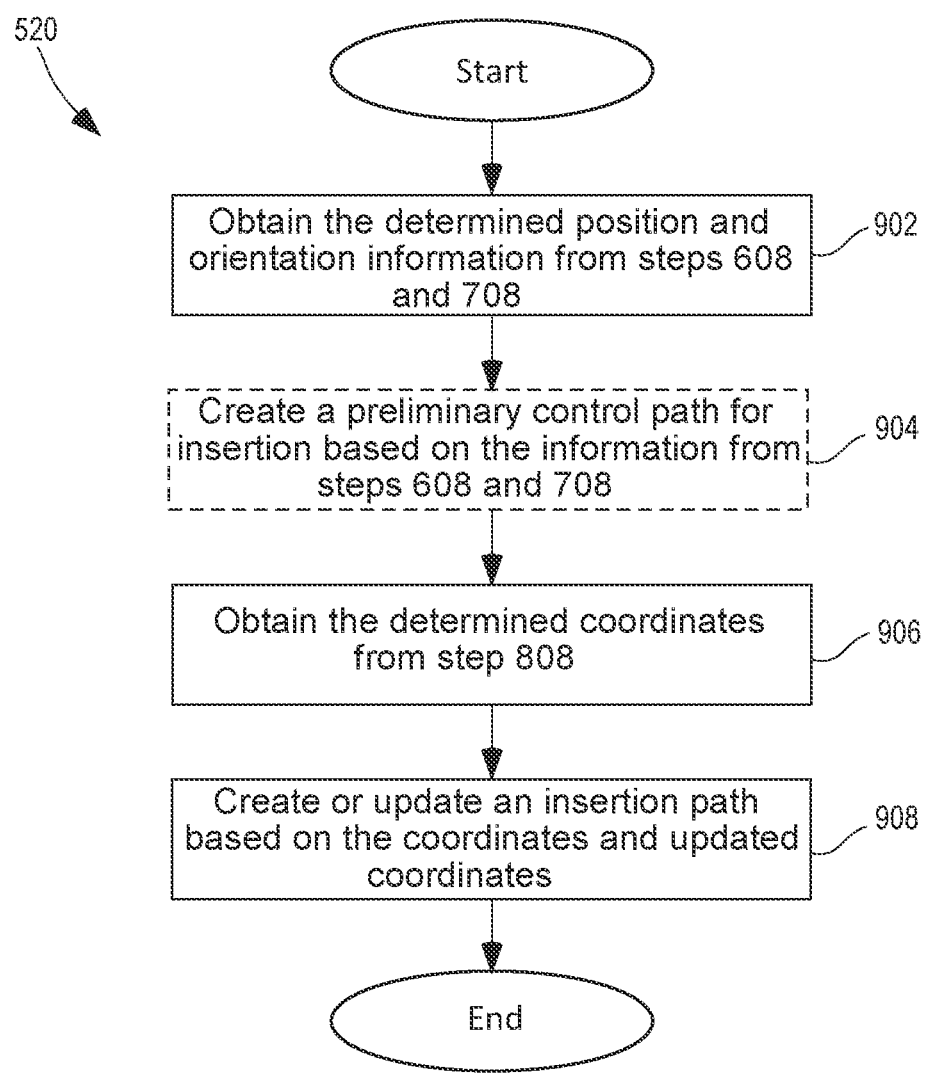
FIG. 9 comprises a flowchart as configured in accordance with various embodiments of these teachings.

Referring to FIG. 9, step 520 is discussed in greater detail. At step 902, the controller utilizes the determined coordinates, including the position and orientation, from steps 608 and 708 discussed above.

In some embodiments, at step 904, the preliminary control path for insertion based on the coordinates from steps 608 and 708 may be created. The preliminary control path for insertion may be described with respect to coordinates, equations, or other mathematical relationships. This preliminary control path for insertion, in aspects, may be programmed into the controller before the insertion of the element into the part is attempted.

At step 906, the controller obtains the determined coordinates, including the position and orientation, from step 808 discussed above. These coordinates are obtained according to the process described above.

At step 908, the controller updates the preliminary control path for insertion based on the determined information from the steps above to generate the insertion path.

In updating the coordinates utilizing the inspection image, the controller may identify the components, such as the seal, the gripper, reference marks on the gripper, the slot, and/or the element. Discussing FIG. 4C, for exemplary purposes, the controller identifies the reference marks 440. The controller further identifies the location or position of the slot 424. The controller determines the location of the reference marks 440 and the slot 424 as compared to known locations of those components. The controller, in identifying the reference marks 440 and the slot 424, may compare the coordinates of each component to the coordinates of the known location for each component.

For example, in FIG. 4C, if the gripper 406 holding the seal 436 was supposed to be directly above the slot 424, the controller, upon analyzing the image, would identify that the gripper 406, the reference marks 440, and/or the slot 424 were not in the known, expected, and/or previously determined positions or locations. In doing so, the controller provides this information to the system for the creation of the insertion path, or in some embodiments, creates the preliminary control path for insertion to adjust the position or location of the gripper 406, and in turn the seal 436 in relation to the slot 424. The controller may then send control signals to move the robotic arm and gripper 406 accordingly and also send control signals to robotic arm and/or the gripper 406 to insert the seal.

It should be understood that the controllers (e.g., the controller 108) provided herein may implement the various functionality described herein. In terms of hardware architecture, such a controller can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in a memory. The processor can be a custom made or commercially available processor, a central processing unit (CPU), an auxiliary processor among several processors associated with the computing device, a semiconductor-based microprocessor (in the form of a microchip or chip set) or generally any device for executing software instructions.

The memory devices (e.g., the memory device of the controller 108 and 208) described herein can include any one or combination of volatile memory elements (e.g., random access memory (RAM), such as dynamic RAM (DRAM), static RAM (SRAM), synchronous dynamic RAM (SDRAM), video RAM (VRAM), and so forth) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The controllers may implement the functions described herein in any combination of hardware and software (e.g., with the software being executed by a controller). The software may be stored in any memory device and may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a computer media (e.g., a computer memory as described above) and these instructions can be executed on a controller such as a microprocessor. However, as mentioned, these approaches can be implemented as any combination of electronic hardware and/or software.

Further aspects of the disclosure are provided by the subject matter of the following clauses:

A system, the system including: a robotic arm; a manipulator device coupled to an end of the robotic arm; a first sensor coupled to the robotic arm, wherein the first sensor is arranged to obtain a first image, the first image including the manipulator device and a target location for the manipulator device; and a controller coupled to the robotic arm and the manipulator device, wherein the controller controls motion of the robotic arm and operation of the manipulator device; wherein the controller is configured to: analyze the first image to obtain a relationship between the target location and a manipulator location; and determine a path for the robotic arm to move the manipulator device to the target location based on the relationship between the target location and the manipulator location.

The system of any preceding clause wherein the controller is configured to move the manipulator device and first sensor from a first location to a second location prior to obtaining the first image, wherein the first location is not in a vicinity of the target location and the second location is in a vicinity of the target location.

The system of any preceding clause wherein the manipulator device is configured to grip a component.

The system of any preceding clause wherein the target location is a slot of an engine element, and wherein the manipulator device is configured to insert the component into the slot of the engine element.

The system of any preceding clause wherein the controller is configured to obtain a second image and distance information from a second sensor and analyze the second image and the distance information to obtain slot orientation information and z-axis information, the slot orientation information and the z-axis information describing an orientation and a position of the slot in the engine element as disposed in a carrier relative to the robotic arm.

The system of any preceding clause wherein the controller is configured to obtain a third image of the component from a third sensor and analyze the third image to obtain component orientation information, the component orientation information describing an orientation of the component relative to the manipulator device.

The system of any preceding clause wherein the controller is configured to correlate a slot location, the slot orientation information, the z-axis information, and the component orientation information to determine an insertion path for the robotic arm to insert the component into the slot of the engine element.

The system of any preceding clause wherein the second sensor includes a camera and a laser device, wherein: the camera and the laser device are coupled to the robotic arm and the controller, and the camera and the laser device are configured to obtain the z-axis information.

The system of any preceding clause wherein the third sensor includes a camera, wherein: the camera is positioned above the robotic arm within a workspace, the camera is coupled to the controller, and the camera obtains the component orientation information.

The system of any preceding clause wherein the manipulator device includes two pinching members configured to hold a component.

The system of any preceding clause wherein the manipulator device further includes at least one reference mark on the manipulator device.

A method, the method including: arranging a manipulator device coupled to an end of a robotic arm; arranging a first sensor coupled to the robotic arm to obtain a first image, wherein the first image includes the manipulator device and a target location for the manipulator device; controlling a motion of the robotic arm and an operation of the manipulator device using a controller; analyzing the first image to obtain a relationship between the target location and a manipulator location using the controller; and determining a path for the robotic arm to move the manipulator device to the target location based on the relationship between the target location and the manipulator location.

The method of any preceding clause wherein the controller is configured to move the manipulator device and the first sensor from a first location to a second location prior to obtaining the first image, wherein the first location is not in a vicinity of the target location and the second location is in a vicinity of the target location.

The method of any preceding clause wherein the manipulator device is configured to grip a component.

The method of any preceding clause wherein the target location is a slot of an engine element, and wherein the manipulator device is configured to insert the component into the slot of the engine element.

The method of any preceding clause wherein including obtaining a second image and distance information from a second sensor and analyze the second image and the distance information to obtain slot orientation information and z-axis information, the slot orientation information and the z-axis information describing an orientation and a position of the slot in the engine element as disposed in a carrier relative to the robotic arm.

The method of any preceding clause further including obtaining a third image of the component from a third sensor and analyze the third image to obtain component orientation information, the component orientation information describing an orientation of the component relative to the manipulator device.

The method of any preceding clause further including correlating the target location, the slot orientation information, the z-axis information, and the component orientation information to determine an insertion path for the robotic arm to insert the component into the slot of the engine element.

The method of any preceding clause wherein the second sensor includes a camera and a laser device, wherein the camera and the laser device are coupled to the robotic arm and the controller, and the camera and the laser device are configured to obtain the z-axis information.

The method of any preceding clause wherein the third sensor includes a camera, wherein: the camera is positioned above the robotic arm within a workspace, the camera is coupled to the controller, and the camera obtains the component orientation information.

A system, the system comprising: a robotic arm; a gripper device coupled to an end of the robotic arm; a first sensor coupled to the robotic arm, wherein the first sensor is arranged to obtain a first image, the first image being of an engine element including a slot in which a component is to be inserted by the gripper device, the first image being obtained before insertion of the component in the slot, and in a vicinity of the slot, including the gripper device; and a controller coupled to the robotic arm and the gripper device, wherein the controller controls a motion of the robotic arm and an operation of the gripper device; wherein the controller is configured to: obtain the first image from the first sensor and analyze the first image to obtain slot position information, the slot position information describing a position of the slot with respect to the gripper device; obtain a second image and distance information from a second sensor and analyze the second image and the distance information to obtain slot orientation information and z-axis information, the slot orientation information and the z-axis information describing an orientation and a position of the slot in the engine element as disposed in a carrier relative to the robotic arm; obtain a third image of the component from a third sensor and analyze the third image to obtain component orientation information, the component orientation information describing an orientation of the component relative to the gripper device; correlate the slot position information, the slot orientation information, the z-axis information, and the component orientation information to determine or adjust an insertion path for the robotic arm to insert the component into the slot of the engine element; and form and apply control signals to cause the robotic arm to move and the gripper device to operate according to the insertion path.

A method, the method comprising: controlling a motion of a robotic arm and an operation of a gripper device coupled to an end of the robotic arm using a controller; arranging a first sensor coupled to the robotic arm to obtain a first image, wherein the first image being of an engine element including a slot in which a component is to be inserted by the gripper device, the first image being obtained before insertion of a component in the slot, and in a vicinity of the slot, including the gripper device; obtaining the first image from the first sensor and analyzing the first image using the controller to obtain slot position information, the slot position information describing a position of the slot with respect to the gripper device; obtaining a second image and distance information from a second sensor and analyzing the second image and the distance information using the controller to obtain slot orientation information and z-axis information, the slot orientation information and the z-axis information describing an orientation and a position of the slot in the engine element as disposed in a carrier relative to the robotic arm; obtaining a third image of the component from a third sensor and analyzing the third image using the controller to obtain a component orientation information, the component orientation information describing an orientation of the component relative to the gripper device; correlating the slot position information, the slot orientation information, the z-axis information, and the component orientation information to determine or adjust an insertion path for the robotic arm to insert the component into the slot of the engine element; and forming and applying control signals to cause the robotic arm to move and the gripper device to operate according to the insertion path.

Those skilled in the art will recognize that a wide variety of modifications, alterations, and combinations can be made with respect to the above-described embodiments without departing from the scope of the disclosure, and that such modifications, alterations, and combinations are to be viewed as being within the ambit of the disclosed concept.

What is claimed is:

1. A system, comprising:
a robotic arm;
a gripper coupled to an end of the robotic arm;
a first sensor coupled to the robotic arm, wherein the first sensor is arranged to obtain a first image, the first image including the gripper and a target location in an engine element for the gripper to insert or place an engine component;
a second sensor coupled to the robotic arm and configured to obtain a second image;
a third sensor unattached to the robotic arm in a workspace and configured to obtain a third image; and
a controller coupled to the robotic arm and the gripper, wherein the controller controls motion of the robotic arm and operation of the gripper, wherein the controller is configured to:
control the second sensor to obtain the second image, the second image showing the engine element and the target location within the engine element;
analyze the second image to determine coordinates of the target location and/or the engine element relative to the robotic arm;
control the robotic arm and the gripper to grip the engine component;
control the third sensor to obtain the third image, the third image showing the engine component and the gripper;
analyze the third image to determine coordinates of the engine component relative to the gripper;
control the robotic arm to position the gripper in a vicinity of the target location;
create a preliminary control path for insertion of the engine component at the target location based upon the analysis of the second image and the third image;
control the first sensor to obtain the first image, the first image showing the gripper, the engine element and reference marks on the gripper, and analyze the first image to determine coordinates of the gripper and the component relative to the target location;
update the preliminary control path to form a final control path based upon the analysis of the first image; and
controls to the robotic arm to insert the engine component to the engine element at the target location according to the final control path.

2. The system of claim 1, wherein the controller is configured to move the gripper and first sensor from a first location to a second location prior to obtaining the first image, wherein the first location is not in the vicinity of the target location and the second location is in the vicinity of the target location.

3. The system of claim 1, wherein the target location is a slot of the engine element, and wherein the gripper is configured to insert the component into the slot of the engine element.

4. The system of claim 3, wherein the controller is further configured to obtain distance information from the second sensor and analyze the second image and the distance information to obtain slot orientation information and z-axis information, the slot orientation information and the z-axis information describing an orientation and a position of the slot in the engine element as disposed in a carrier relative to the robotic arm.

5. The system of claim 4, wherein the controller is configured to analyze the third image to obtain component orientation information, the component orientation information describing an orientation of the engine component relative to the gripper.

6. The system of claim 4, wherein the second sensor comprises a camera and a laser device, wherein: the camera and the laser device are coupled to the robotic arm and the controller, and the camera and the laser device are configured to obtain the z-axis information.

7. The system of claim 5, wherein the third sensor comprises a camera, wherein: the camera is positioned above the robotic arm within the workspace, the camera is coupled to the controller, and the camera obtains the component orientation information.

8. The system of claim 1, wherein the gripper comprises two pinching members configured to hold the engine component.

9. A method, the method comprising:
arranging a gripper coupled to an end of a robotic arm;
arranging a first sensor coupled to the robotic arm to obtain a first image, wherein the first image includes the gripper and a target location for the gripper;
arranging a second sensor coupled to the robotic arm to obtain a second image;
arranging a third sensor unattached to the robotic arm in a workspace to obtain a third image;
by a controller:
controlling the second sensor to obtain the second image, the second image showing an engine element and a target location within the engine element;
analyzing the second image to determine the coordinates of the target location and/or engine element relative to the robotic arm;
controlling the robotic arm and the gripper to grip an engine component;

controlling the third sensor to obtain the third image, the third image showing the engine component and the gripper;
analyzing the third image to determine coordinates of the engine component relative to the gripper;
controlling the robotic arm to position the gripper in a vicinity of the target location;
creating a preliminary control path for insertion of the engine component at the target location based upon the analysis of the second image and the third image;
controlling the first sensor to obtain the first image, the first image showing the gripper, the engine element and reference marks on the gripper, and analyzing the first image to determine coordinates of the gripper and the component relative to the target location;
updating the preliminary control path to form a final control path based upon the analysis of the first image; and
controlling the robotic arm to insert the engine component to the engine element at the target location according to the final control path.

10. The method of claim 9, wherein the controller is configured to move the gripper and the first sensor from a first location to a second location prior to obtaining the first image, wherein the first location is not in the vicinity of the target location and the second location is in the vicinity of the target location.

11. The method of claim 9, wherein the gripper is configured to grip the engine component.

12. The method of claim 11, wherein the target location is a slot of the engine element, and wherein the gripper is configured to insert the engine component into the slot of the engine element.

13. The method of claim 12, further comprising obtaining a distance information from the second sensor and analyzing the second image and the distance information to obtain slot orientation information and z-axis information, the slot orientation information and the z-axis information describing an orientation and a position of the slot in the engine element as disposed in a carrier relative to the robotic arm.

14. The method of claim 13, further comprising analyzing the third image to obtain component orientation information, the component orientation information describing an orientation of the component relative to the gripper.

15. The method of claim 13, wherein the second sensor comprises a camera and a laser device, wherein the camera and the laser device are coupled to the robotic arm and the controller, and the camera and the laser device are configured to obtain the z-axis information.

16. The method of claim 14, wherein the third sensor comprises a camera, wherein: the camera is positioned above the robotic arm within a workspace, the camera is coupled to the controller, and the camera obtains the component orientation information.

* * * * *

UNITED STATES PATENT AND TRADEMARK OFFICE
CERTIFICATE OF CORRECTION

| | | |
|---|---|---|
| PATENT NO. | : 12,240,130 B2 | Page 1 of 1 |
| APPLICATION NO. | : 17/857511 | |
| DATED | : March 4, 2025 | |
| INVENTOR(S) | : Lizotte et al. | |

It is certified that error appears in the above-identified patent and that said Letters Patent is hereby corrected as shown below:

In the Claims

In Column 27, Claim 1, Line 52, delete "gripper," and insert -- gripper; --, therefor.

In Column 30, Claim 13, Line 8, delete "a distance" and insert -- distance --, therefor.

Signed and Sealed this
Twenty-seventh Day of May, 2025

Coke Morgan Stewart
*Acting Director of the United States Patent and Trademark Office*